US008204615B2

(12) United States Patent
Yamada et al.

(10) Patent No.: US 8,204,615 B2
(45) **Date of Patent: *Jun. 19, 2012**

(54) INFORMATION PROCESSING DEVICE, INFORMATION PROCESSING METHOD, AND PROGRAM

(75) Inventors: Yuji Yamada, Tokyo (JP); Koyuru Okimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 966 days.

This patent is subject to a terminal disclaimer.

(21) Appl. No.: 12/221,527

(22) Filed: Aug. 4, 2008

(65) Prior Publication Data

US 2009/0043411 A1 Feb. 12, 2009

(30) Foreign Application Priority Data

Aug. 6, 2007 (JP) ................................ 2007-204685

(51) Int. Cl.
*G06F 17/00* (2006.01)
*G06F 3/16* (2006.01)
*A63F 9/24* (2006.01)

(52) U.S. Cl. ............................. 700/94; 715/727; 463/35

(58) Field of Classification Search .................... 700/94; 715/716, 727; 463/33, 35
See application file for complete search history.

(56) References Cited

U.S. PATENT DOCUMENTS

| | | | | |
|---|---|---|---|---|
| 5,862,229 | A * | 1/1999 | Shimizu | 381/17 |
| 7,369,667 | B2 | 5/2008 | Yamada | |
| 2002/0150254 | A1 * | 10/2002 | Wilcock et al. | 381/1 |
| 2004/0013278 | A1 * | 1/2004 | Yamada | 381/309 |
| 2006/0251263 | A1 * | 11/2006 | Vronay | 381/17 |
| 2007/0021961 | A1 * | 1/2007 | Oh | 704/273 |

FOREIGN PATENT DOCUMENTS

| | | | |
|---|---|---|---|
| JP | 04-030700 | A | 2/1992 |
| JP | 05-080755 | A | 4/1993 |
| JP | 09-215100 | A | 8/1997 |
| JP | 11-259071 | A | 9/1999 |
| JP | 2002-149163 | A | 5/2002 |
| JP | 2003-304600 | A | 10/2003 |
| JP | 2006-201655 | A | 8/2006 |
| JP | 2007-174275 | A | 7/2007 |
| WO | WO 02/065814 | A1 | 8/2002 |

* cited by examiner

*Primary Examiner* — Jesse Elbin
(74) *Attorney, Agent, or Firm* — Wolf, Greenfield & Sacks, P.C.

(57) ABSTRACT

An information processing device for reproducing content data is provided. The information processing device includes a reproducing unit for reproducing content data; a sound image localization processing unit for sound image localization processing the content data to be reproduced by the reproducing unit so that a sound image by the content data localizes at an arbitrary localization position; and a control unit for moving the localization position of the sound image in response to change in reproduction state of the content data by the reproducing unit.

13 Claims, 23 Drawing Sheets

INFORMATION PROCESSING DEVICE, INFORMATION PROCESSING METHOD, AND PROGRAM

CROSS REFERENCES TO RELATED APPLICATIONS

The present invention contains subject matter related to Japan Patent Application JP 2007-204685 filed in the Japan Patent Office on Aug. 6, 2007, the entire contents of which being incorporated herein by reference.

BACKGROUND OF THE INVENTION

1. Field of the Invention

The present invention relates to an information processing device, an information processing method, and a program.

2. Description of the Related Art

In recent years, an audio listening mode of taking various music outside and enjoying the music with a portable audio equipment is being widespread. In most cases, a great number of music is stored in a memory, and is reproduced using a reproducing device such as headphone and speaker according to the portable audio equipment.

In audio equipments such as portable audio equipment, a method of simply pushing the play button, or pushing a select button such as forward select or reverse select key to search for the next music and then pushing the play button to reproduce the music is adopted when selecting an arbitrary music from a plurality of music and reproducing the relevant music.

SUMMARY OF THE INVENTION

In this case, if a previous music is being reproduced when starting to reproduce a new music, a method of once stopping the sound of the relevant music, and reproducing the sound of the newly selected music is known as one example of a method of reproducing music.

However, in such reproducing method, a silent time zone is created between the reproduction of the previous music and the reproduction of the new music, or switch is suddenly made to a different music, and thus a smooth sound connection may not be provided to the audience.

Another example of music reproducing method includes a method of starting the reproduction of music through a so-called "fade-in" of gradually raising the volume of the selected music, and stopping the music through a so-called "fade-out" of gradually lowering the volume. Furthermore, in order to eliminate the silent time zone between the reproduction of the previous music and the reproduction of the new music, a method of realizing smooth music connection or start/end through a so-called "cross-fade" of overlapping the first reproduction of the new music and the last reproduction of the previous music, and reproducing the respective music through fade-in and fade-out is also proposed.

If the music reproducing method according to the related art is used, connection of the reproduction of music and the reproduction of the following music, start of reproduction, and stop of reproduction become smooth to a certain extent. However, since a plurality of music is reproduced in an overlapping manner from the same reproducing device in cross-fade reproduction, the individual music becomes difficult to distinguish during cross-fade, and the audience might feel stress due to the unnatural switching of the reproduction state of music.

The demand of the audience to listen with satisfactory sound regardless of the location in recent years is further increasing, and it is desired for the audio equipment etc. to respond to such demands of the audience. In reality, the demand of the audience is not only on the sound quality during reproduction, but extends to a more natural reproduction of music even in a reproduction state such as start, end, pause, and resume of music reproduction, switching of reproducing music, and the like.

In view of the above issues, it is desirable to provide a more natural and realistic sound to the audience in various reproduction states of the music.

In relation to the above issues, one embodiment of the present invention provides an information processing device including a reproducing unit for reproducing content data; a processing unit for processing the content data to be reproduced by the reproducing unit so that a sound image by the content data localizes at an arbitrary position; and a control unit for moving the position at where the sound image localizes in response to change in reproduction state of the content data by the reproducing unit.

According to such configuration, the reproducing unit reproduces the content data, and the control unit moves the localization position in the sound image localization process when the reproduction state of the content data is changed. The processing unit sound image localization processes the reproduced content data so that the sound localizes at the moved localization position. Therefore, the content data can be provided while moving the sound image by the content data according to various changes in reproduction state.

The control unit may move the position at where the sound image localizes when the reproducing unit starts or ends the reproduction of the content data. According to such configuration, the sound image by the content data can be moved when the reproducing unit starts the reproduction of the content data as change in reproduction state. The sound image by the content data also can be moved when the reproducing unit ends the reproduction of the content data as change in reproduction state.

The control unit may move the position at where the sound image localizes so as to move closer to an audience when the reproducing unit starts the reproduction of the content data, and move the position at where the sound image localizes so as to move away from the audience when the reproducing unit ends the reproduction of the content data.

According to such configuration, the sound image by the content data to be listened by the audience moves so as to move closer to the audience when the reproduction of the content data is started, and moves so as to move away from the audience when the reproduction of the content data is ended. Therefore, the start and the end of reproduction of the content data can be realized as if the sound emitting source is spatially moving, thereby enabling the audience to recognize the start or the end of reproduction of the content data by such spatial movement.

A selecting unit for selecting content data to be reproduced by the reproducing unit from a plurality of content data may be further arranged; wherein when the selecting unit selects second content data while the reproducing unit is reproducing first content data, the control unit may move the positions at where the sound images by the first content data and the second data localize, and cause the reproducing unit to end the reproduction of the first content data and start the reproduction of the second content data. According to such configuration, the reproduction of the first content data can be ended and the reproduction of the second content data can be started while moving the sound images by both content data when changing from a state of reproducing the first content data to a state of reproducing the second content data as change in reproduction state. Therefore, the reproducing content data can be smoothly switched from the first content data to the second data.

The control unit may move the position at where the sound image by the first content data localizes so as to move away from an audience, and move the position at where the sound image by the second content data localizes so as to move closer to the audience. According to such configuration, the sound image by the first content data which reproduction is to be ended can be moved so as to move away from the audience, and the sound image by the second content data which reproduction is to be started can be moved so as to move closer to the audience. Therefore, the sound image of the first content data and the sound image of the second content data are prevented from overlapping. The reproducing content data thus can be smoothly switched from the first content data to the second content data.

The reproducing order of the plurality of content data is determined; and the control unit may reverse moving directions of the positions at where the sound image by the first content data and the second content data localize between when the reproducing order of the second content data is before and after the reproducing order of the first content data. According to such configuration, the sound image can be moved in one direction if the reproducing order of the second content data is before the reproducing order of the first content data, and the sound image can be moved in a direction opposite to the former direction if the reproducing order of the second content data is after the reproducing order of the first content data. Therefore, the audience can recognize whether the content data is being reproduced in the reproducing order or the content data of the reproducing order opposite to the reproducing order is being reproduced according to the moving direction.

The selecting unit has two or more methods of selecting the content data to be reproduced by the reproducing unit from the plurality of content data; and the control unit may move the positions at where the sound images by the first content data and the second content data localize in different directions for every method the second content data is selected. According to such configuration, the moving direction of the sound image can be differed according to the method of selecting the second content data. Therefore, the audience can recognize that the method of selecting the second content data is different according to the difference in the moving direction.

The direction of moving the positions at where the sound images by the first content data and the second content data localize may include at least left and right direction and up and down direction with respect to the audience. According to such configuration, the sound image can be moved in the left and right direction if the method of selecting the second content data is a certain method, and the sound image can be moved in the up and down direction if the method of selecting the second content data is another method. Therefore, an interface such as so-called Cross Media Bar (registered trademark, XMB) can be provided to the audience according to the moving direction of the localization position of the sound image.

The plurality of content data is respectively corresponded with attribute information; and the selecting unit may include a first method of selecting the second content data from at least one content data corresponded with the attribute information same as the first content data, and a second method of selecting the second content data from at least one content data corresponded with the attribute information different from the first content data. According to such configuration, the direction the sound image moves can be differed between when the attribute information of both content data are the same and when the attribute information of both content data are different when the reproducing content data is changed from the first content data to the second content data. Therefore, the audience can recognize whether the attribute information of the reproducing content data is the same or is different by the moving direction.

A volume varying unit of fading in the content data when the reproducing unit starts the reproduction of the content data, and fading out the content data when the reproducing unit ends the reproduction of the content data may be further arranged. According to such configuration, fade-in can be carried out when starting the reproduction of the content data, and fade-out can be carried out when ending the reproduction of the content data by means of the volume varying unit. Therefore, the start and the end of reproduction of the content data can be more smoothly carried out.

A volume varying unit of cross fading the first content data and the second content data by increasing a reproduction volume of the second content data while decreasing a reproduction volume of the first content data may be further arranged. According to such configuration, both content data can be cross-faded by the volume varying unit when the reproducing unit switches the reproducing content data from the first content data to the second content data. Therefore, the switching of the reproducing content data can be more smoothly carried out.

The control unit may move the position at where the sound image localizes when the reproducing unit pauses or resumes the reproduction of the content data. According to such configuration, the sound image by the content data can be moved when the reproducing unit brings to pause the reproduction of the content data as change in reproduction state. Furthermore, the sound image by the content data can be moved when the reproducing unit resumes the reproduction of the content data as change in reproduction state.

The processing unit includes a plurality of filters in which the position at where the sound image localizes differs from each other; and the control unit may move the position at where the sound image localizes by allocating and inputting an audio signal obtained by reproducing the content data in the reproducing unit to the plurality of filters. According to such configuration, the localization position of the sound image can be moved by having the control unit allocate the audio signal to a plurality of sound image localization filters. Therefore, the time for changing the localization position in the sound image localization process can be reduced, and a faster process can be realized.

The processing unit includes a filter in which the position at where the sound image localizes is changeable; and the control unit may move the position at where the sound image localizes by changing a coefficient of the filter for determining the position at where the sound image localizes. According to such configuration, the localization position of the sound image can be moved by having the control unit change the coefficient of the sound image localization filter. Therefore, the localization position of the sound image can be moved.

Furthermore, in relation to the above described issues, another embodiment of the present invention provides an information processing method including the steps of reproducing content data; and when processing so that a sound image by the content data in reproduction localizes at an arbitrary position, moving a position at where the sound image by the process localizes according to change in reproduction state of the content data. According to such configuration, content data can be provided while moving the sound image by the content data according to various changes in reproduction state.

Moreover, in relation to the above described issues, another embodiment of the present invention provides a program for causing a computer to realize reproducing function of reproducing content data; processing function of processing the content data to be reproduced by the reproducing function so that a sound image by the content data localizes at an arbitrary position; and controlling function of moving the position at where the sound image localizes in response to change in reproduction state of the content data by the reproducing function. According to such configuration, content data can be provided while moving the sound image by the content data according to various changes in reproduction state.

According to the embodiments of the present invention described above, a more natural and realistic sound can be provided to the audience in various reproduction states of music.

DETAILED DESCRIPTION OF THE PREFERRED EMBODIMENTS

Figure 1:
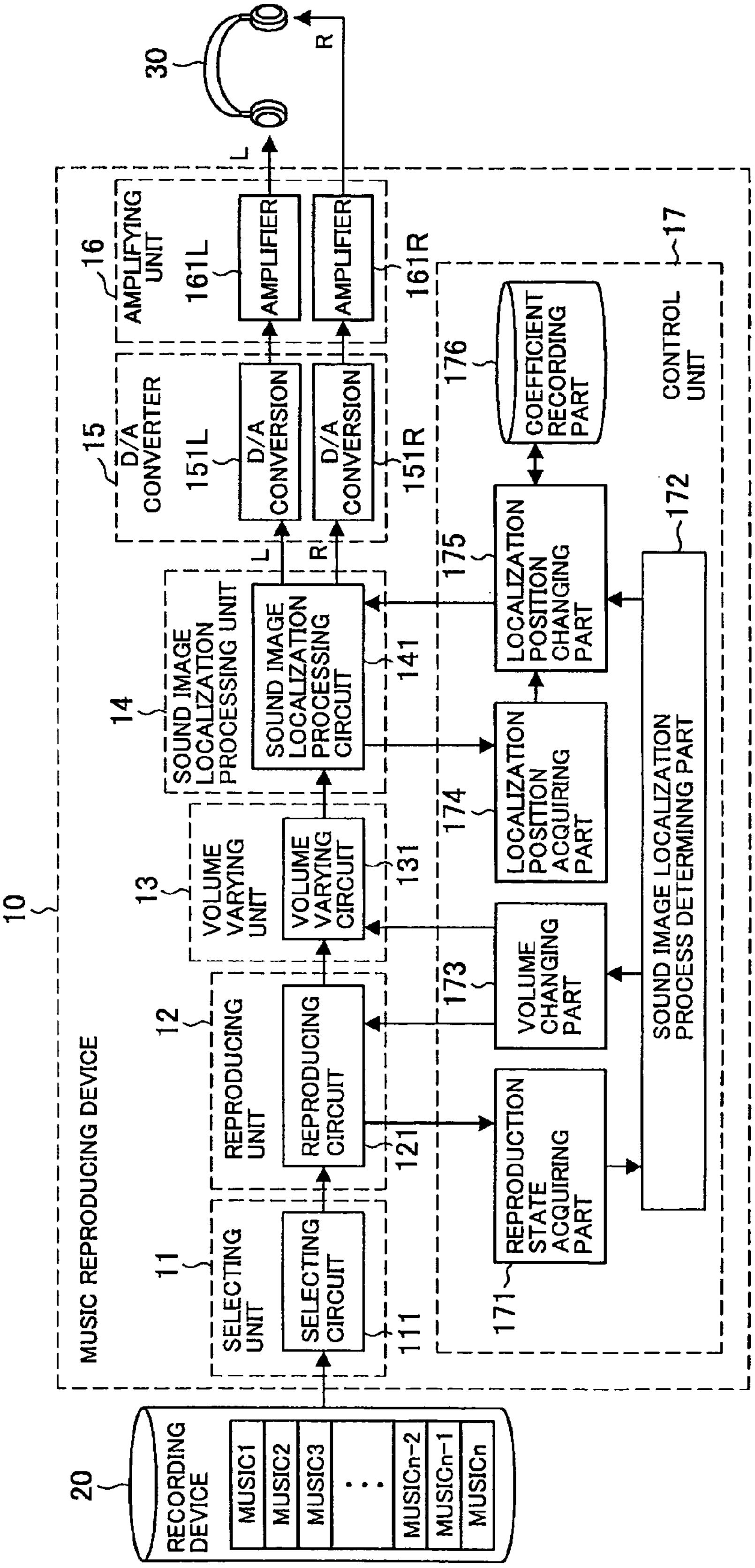
FIG. 1 is an explanatory view describing a configuration of a music reproducing device according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<1. First Embodiment>

A music reproducing device according to a first embodiment of the present invention will now be described with reference to FIG. 1. FIG. 1 is an explanatory view describing a configuration of the music reproducing device according to the first embodiment of the present invention.

A music reproducing device 10 is an example of an information processing device according to an embodiment of the present invention, and is connected to a recording device 20 for recording digital data of a plurality of content data, and an output device for outputting sound, as shown in FIG. 1. The music reproducing device 10 selects digital data of the content data to be reproduced from the recording device 20 and reproduces the same, and provides the sound of the reproduced content data to the audience (hereinafter also referred to as "listener") of the content data through the output device.

The music reproducing device 10 moves a position at where a sound image of the sound by the content data is localized according to change in reproduction state of the content data. In the present embodiment, a case where such "change in reproduction state" is "start of reproduction of content data" or "end of reproduction of content data" will be described. That is, "reproduction state" in the present embodiment indicates "in-reproduction", "non-reproducing state" and the like. The change from "non-reproducing state" to "in-reproduction" indicates "start of reproduction of content data", and change from "in-reproduction" to "non-reproducing state" indicates "end of reproduction of content data".

A case where the content data to be reproduced is, for example, music of monaural sound (e.g., "music 1 to music n"), and the output device is a headphone 30 will be described below.

(1-1. Configuration of Music Reproducing Device 10)

As shown in FIG. 1, the music reproducing device 10 includes a selecting unit 11, a reproducing unit 12, a volume varying unit 13, a sound image localization processing unit 14, a D/A converter 15, an amplifying unit 16, and a control unit 17.

The selecting unit 11 includes a selecting circuit 111, which selecting circuit 111 is connected to the recording device 20 and the reproducing unit 12. The selecting circuit 111 selects and acquires digital data of the music to be reproduced from the recording device 20, and outputs the acquired digital data to the reproducing unit 12. The selecting circuit 111 may be connected to a separate control device etc. (not shown), so that music can be selected by the operation of the audience or by the setting defined in advance.

The reproducing unit 12 includes a reproducing circuit 121, which reproducing circuit 121 is connected to the selecting unit 11, the volume varying unit 13, and the control unit 17. The reproducing circuit 121 acquires the digital data of the music selected by the selecting unit 11, reproduces the relevant music, and outputs the reproduced signal (hereinafter also referred to as "audio signal") to the volume varying unit 13.

The reproducing circuit 121 is connected to a separate control device etc. (not shown) to start/end the reproduction of the music by the operation of the audience or by the setting defined in advance. The reproducing circuit 121 outputs the "reproduction state information", that is, information indicating whether in in-reproduction or in non-reproducing state to the control unit 17.

The volume varying unit 131 includes a volume varying circuit 131, which volume varying circuit 131 is connected to the reproducing unit 12, the sound image localization processing unit 14, and the control unit 17. The volume varying circuit 131 adjusts the volume of the audio signal of the music reproduced by the reproducing unit 12, and outputs the same to the sound image localization processing unit 14.

The volume varying circuit 131 adjusts the volume while being controlled by the control unit 17. If the change in reproduction state is the start of reproduction of the music (hereinafter simply referred to as "at the start of reproduction"), the volume varying circuit 131 increases the volume to a predetermined magnitude so that the music fades in. If the change in reproduction state is the end of reproduction of the music (hereinafter simply referred to as "at the end of reproduction"), the volume varying circuit 131 decreases the volume so that the music fades out.

The sound image localization processing unit 14 is an example of a processing unit and includes a sound image localization processing circuit 141, which sound image localization processing circuit 141 is connected to the volume varying unit 13, the D/A converter 15, and the control unit 17. The sound image localization processing circuit 141 performs a process (hereinafter also referred to as "sound image localization process") of changing the position at where the sound image of the audio signal is localized (hereinafter also referred to as "localization position" or "sound image localization position") with respect to the audio signal from the volume varying unit 13, and generates a left channel signal and a right channel signal. The left channel signal and the right channel signal are output to the D/A converter 15.

In this case, the sound image localization processing circuit 141 can arbitrarily change the localization position of the sound image in the sound image localization process, and such localization position is moved by the control unit 17. The localization position is moved so that the sound image of the music moves closer to the listener at the start of reproduction, and is moved so that the sound image of the music moves away from the listener at the end of reproduction. More specifically, the localization position is moved from the front side on the left of the listener towards the front side on the front at the start of reproduction, and is moved from the front side on the front of the listener towards the front side on the right at the end of reproduction.

Figure 2:
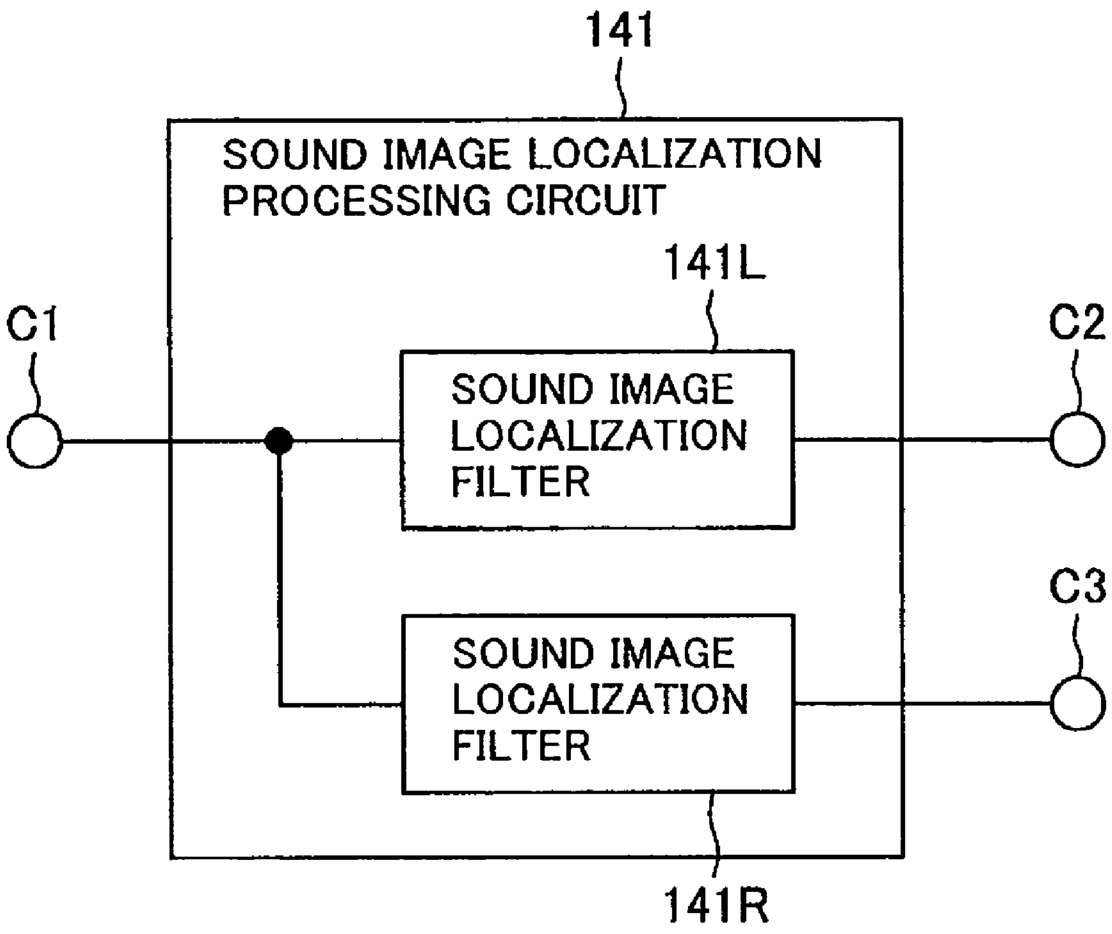
FIG. 2 is an explanatory view describing a configuration example of a sound image localization processing unit according to the embodiment.

Specific configuration example of the sound image localization processing circuit 141 will be described with reference to FIG. 2. FIG. 2 is an explanatory view describing a configuration example of the sound image localization processing unit.

As shown in FIG. 2, the sound image localization processing circuit 141 includes sound image localization filters 141L, 141R. A terminal C1 is connected to the volume varying unit 13 and terminals C2, C3 are connected to the D/A converter 15, where the left channel signal is output from the terminal C2, and the right channel signal is output from the terminal C3.

Figure 3:
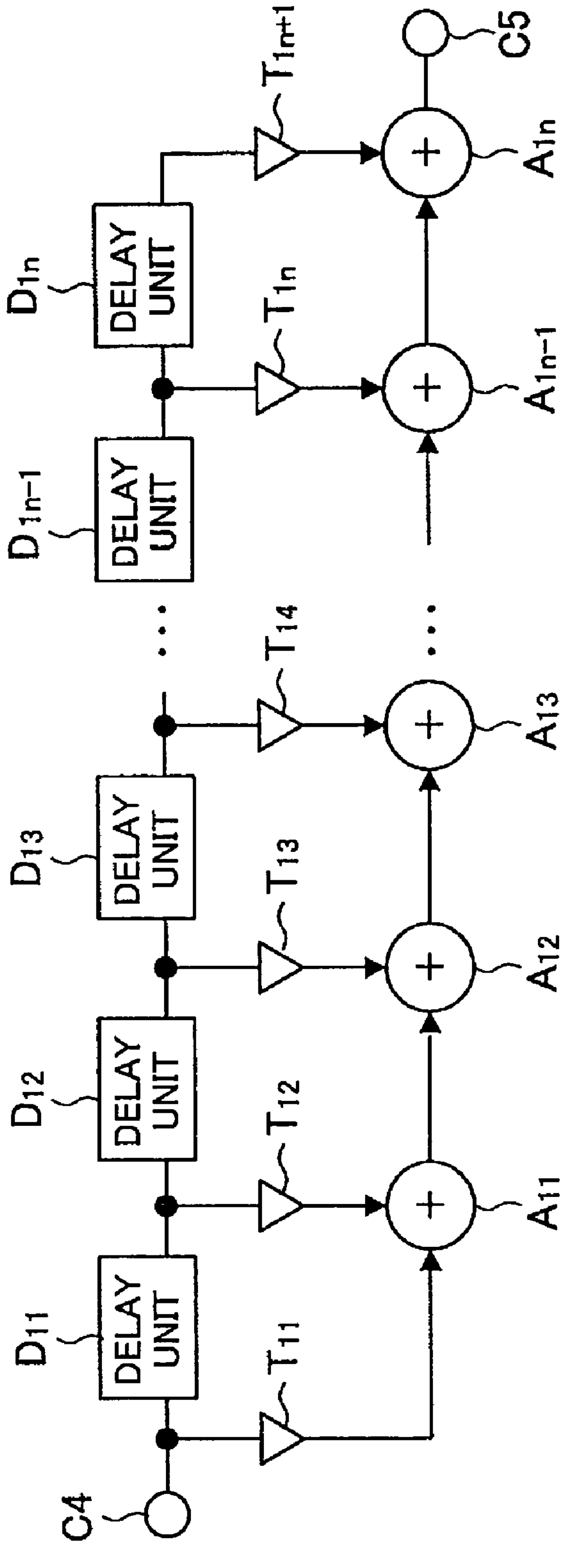
FIG. 3 is an explanatory view describing a sound image localization filter.

Each sound image localization filter 141L, 141R is configured by an FIR filter (Finite Impulse Response Filter) as shown in FIG. 3. FIG. 3 is an explanatory view describing the sound image localization filter.

The FIR filter is an example of a filter which performs a convolution operation process of a predetermined impulse response on the input music audio signal, and includes delay units $D_{11}$ to $D_{1n}$, coefficient multipliers $T_{11}$ to $T_{1n+1}$, and adders $A_{11}$ to $A_{1n}$, as shown in FIG. 3.

The coefficient multipliers $T_{11}$ to $T_{1n+1}$ makes the input audio signal to coefficient value times. The delay units $D_{11}$ to $D_{1n}$ delay the input audio signal by a predetermined delay amount. The adders $A_{11}$ to $A_{1n}$ add two audio signals that have passed some delay units $D_{11}$ to $D_{1n}$, and the coefficient multipliers $T_{11}$ to $T_{1n+1}$.

According to such configuration, the FIR filter can perform the convolution operation process of the predetermined impulse response on the input audio signal.

Therefore, as shown in FIG. 2, the sound image localization processing circuit 141 performs the convolution operation process on the audio signal through the sound image localization filter 141L or the sound image localization filter 141R, and generates the left channel signal or the right channel signal.

In this case, the coefficient values of the coefficient multipliers $T_{11}$ to $T_{1n+1}$ are determined by a transfer function (Head Related Transfer Function) of localizing the sound image at a predetermined localization position. That is, the coefficient values of the coefficient multipliers $T_{11}$ to $T_{1n+1}$ of the sound image localization filter 141L are determined by the head related transfer function with respect to the left ear of the user. The coefficient values of the coefficient multipliers $T_{11}$ to $T_{1n+1}$ of the sound image localization filter 141R are determined by the head related transfer function with respect to the right ear of the user.

In other words, the sound image localization processing circuit 141 can localize the sound image at the desired localization position by changing the coefficient values of the sound image localization filters 141L, 141R through the head related transfer function corresponding to the desired localization position.

Therefore, according to the sound image localization processing circuit 141, the convolution process is separately performed for the sound to the right ear of the listener and the sound to the left ear, and the right channel signal and the left channel signal are generated, so that the sound image localization process of localizing the sound image at the predetermined localization position with respect to the listener can be performed. This localization position is sequentially changed to move the localization position. The coefficient values of the sound image localization filters 141L, 141R are changed by the control unit 17.

Refer back to the description on the configuration of the music reproducing device 10 with reference to FIG. 1. The remaining components of the music reproducing device 10, that is, the D/A converter 15, the amplifying unit 16, and the control unit 17 will be described.

The D/A converter 15 is connected to the sound image localization processing unit 14 and the amplifying unit 16. The D/A converter 15 converts the left channel signal or the right channel signal, which are digital signals, output from the sound image localization processing unit 14 to an analog signal, and outputs the same to the amplifying unit 16. More specifically, the D/A converter 15 includes D/A conversion circuits 151L, 151R. The D/A conversion circuit 151L converts the left channel signal from the sound image localization processing unit 14 to an analog signal and outputs the same to the amplifying unit 16. The D/A conversion circuit 151R converts the right channel signal from the sound image localization processing unit 14 to an analog signal, and outputs the same to the amplifying unit 16.

The amplifying unit 16 is connected to the D/A converter 15 and the headphone 30. The amplifying unit 16 amplifies the analog left channel signal and the right channel signal, and outputs the same to the headphone 30. More specifically, the amplifying unit 16 includes amplifiers 161L, 161R. The amplifier 161L amplifies the left channel signal from the D/A conversion circuit 151L, and outputs the same to the left ear speaker of the headphone 30. The amplifier 161R amplifies the right channel signal from the D/A conversion circuit 151R, and outputs the same to the right ear speaker of the headphone 30. The amplifiers 161L, 161R are connected to a separate control device etc. (not shown), so that the amplifying amount of the signal can be changed by the operation of the audience or by the setting defined in advance.

The control unit 17 is connected to the reproducing unit 12, the volume varying unit 13, and the sound image localization processing unit 14. The control unit 17 changes the volume of the volume varying unit 13 and moves the sound image localization position in the process of the sound image localization processing unit 14 based on the reproduction state of the music received from the reproducing unit 12.

Specific configuration of the control unit 17 is as described below.

The control unit 17 includes a reproduction state acquiring part 171, a sound image localization process determining part 172, a volume changing part 173, a localization position acquiring part 174, a localization position changing part 175, and a coefficient recording part 176.

The reproduction state acquiring part 171 is connected to the reproducing unit 12 and the sound image localization process determining part 172. The reproduction state acquiring part 171 acquires the reproduction state from the reproducing unit 12, and outputs the same to the sound image localization process determining part 172.

The sound image localization process determining part 172 is connected to the reproduction state acquiring part 171, the volume changing part 173, and the localization position changing part 175. The sound image localization process determining part 172 outputs “fade-in signal” or “fade-out signal” to the volume changing part 173 according to the reproduction state information from the reproduction state acquiring part 171. Furthermore, the sound image localization process determining part 172 outputs “left approach signal” or “right recede signal” to the localization position changing part 175 according to the reproduction state information.

The fade-in signal is a signal indicating to fade-in reproduce the music, and the fade-out signal is a signal indicating to fade-out reproduce the music. The left approach signal is a signal for moving the localization position of the sound image from the front side on the left of the user towards the front side on the front to move the sound image so as to move closer to the user, and the right recede signal is a signal for moving the localization position of the sound image from the front side on the front of the user towards the front side on the right to move the sound image so as to move away from the user.

More specifically, when the reproduction state information is changed from non-reproducing state to in-reproduction, that is, at the start of reproduction, the sound image localization process determining part 172 outputs the fade-in signal to the volume changing part 173, and outputs the left approach signal to the localization position changing part 175. When the reproduction state information changes from in-reproduction to non-reproducing state, that is, at the end of reproduction, the sound image localization process determining part 172 outputs the fade-out signal to the volume changing part 173, and outputs the right recede signal to the localization position changing part 175.

The volume changing part 173 is connected to the sound image localization process determining part 172 and the volume varying unit 13. The volume changing part 173 changes the volume of the volume varying unit 13, that is, the amplifying amount of the audio signal based on the fade-in signal or the fade-out signal from the sound image localization process determining part 172.

More specifically, the volume changing part 173 increases the amplifying amount of the volume varying unit 13 to a predetermined magnitude when receiving the fade-in signal, and decreases the amplifying amount of the volume varying unit 13 to approximately zero when receiving the fade-out signal.

When receiving the fade-out signal and decreasing the amplifying amount of the volume varying unit 13 to approximately zero, the volume changing part 173 outputs “end signal” to the reproducing unit 12 to end the reproduction when the amplifying amount of the volume varying unit 13 becomes approximately zero.

The localization position acquiring part 174 is connected to the sound image localization processing unit 14 and the localization position changing part 175. The localization position acquiring part 174 acquires information (hereinafter also referred to as “localization position information”) indicating the localization position of the sound image in the sound image localization process performed by the sound image localization processing unit 14, and outputs the same to the localization position changing part 175. The localization position corresponds to a coefficient value based on the head related transfer function described above. Therefore, the localization position acquiring part 174 may acquire the coefficient value as localization position information.

The localization position changing part 175 is connected to the sound image localization process determining part 172, the localization position acquiring part 174, the coefficient recording part 176, and the sound image localization processing unit 14. The localization position changing part 175 moves the localization position of the sound image in the sound image localization process of the sound image localization processing unit 14 based on the left approach signal or the right recede signal from the sound image localization process determining part 172.

More specifically, a plurality of coefficient values of the head related transfer function corresponding to the desired localization position is stored in the coefficient recording part 176 in advance. When receiving the left approach signal or the right recede signal, the localization position changing part

175 acquires from the coefficient recording part 176 the coefficient value of the head related transfer function for moving the localization position in a direction indicated by the relevant signal, and outputs the same to the sound image localization processing unit 14. The sound image localization processing unit 14 moves the localization position by changing the coefficient values of the coefficient multipliers $T_{11}$ to $T_{1n+1}$ of the FIR filter to the received coefficient values.

In this case, the localization position changing part 175 may change the localization position while determining whether the localization position has moved to the desired localization position based on the localization position information from the localization position acquiring part 174.

(a. Other Configuration Examples of the Sound Image Localization Processing Unit 14)

The configuration of the music reproducing device 10 according to the present embodiment has been described above.

A case where the sound image localization processing unit 14 includes the sound image localization processing circuit 141, and the sound image localization processing circuit 141 includes two sound image localization filters 141L, 141R has been described above, but the present invention is not limited to such example. The sound image localization processing unit 14 may be of any configuration as long as the sound image localization process can be performed. Therefore, other configuration examples of the sound image localization processing unit 14 will be described prior to describing the operation of the music reproducing device 10 according to the present embodiment.

(a1. First Variant)

Figure 4:
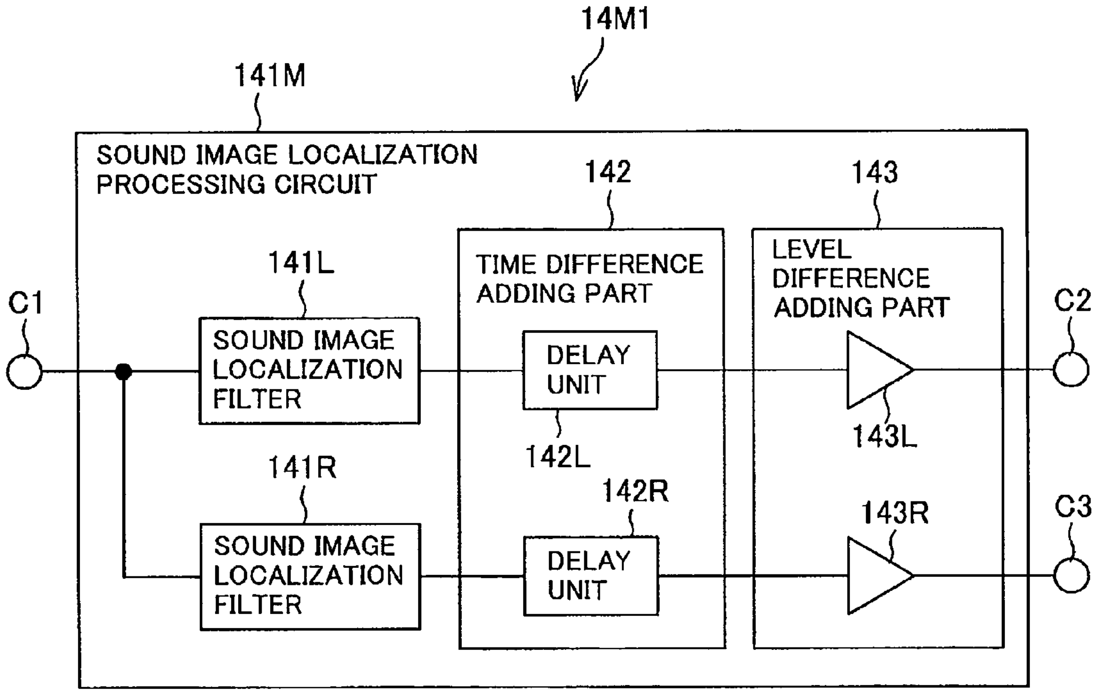
FIG. 4 is an explanatory view describing a first variant of a configuration of the sound image localization processing unit according to the embodiment.

The configuration of a sound image localization processing unit 14M1 according to a first variant is shown in FIG. 4.

The sound image localization processing unit 14M1 according to the first variant includes a sound image localization processing circuit 141M. The sound image localization processing circuit 141M includes a time difference adding part 142 and a level difference providing part 143 in addition to the sound image localization filters 141L, 141R, as shown in FIG. 4.

The time difference adding part 142 is configured by delay units 142L, 142R.

The delay units 142L, 142R are respectively connected to the sound image localization filter 141L or the sound image localization filter 141R. Each delay unit 142L, 142R delays the left channel signal or the right channel signal output from the sound image localization filter 141L or the sound image localization filter 141R by a predetermined delay amount to provide a time difference between the left and the right.

The level difference providing part 143 is configured by level controllers 143L, 143R.

The level controllers 143L, 143R are respectively connected to the delay unit 142L or the delay unit 142R. Each level controller 143L, 143R provides a level difference to the left channel signal or the right channel signal given time difference by the delay unit 142L or the delay unit 142R, and outputs the same to the D/A converter 15.

In addition to the coefficient values of the sound image localization filters 141L, 141R, each delay amount of the delay units 142L, 142R, and each level amount of the level controllers 143L, 143R are also changed by the control unit 17 based on the predetermined head related transfer function.

According to the sound image localization processing unit 14M1 of the first variant configured as above, the time difference and the level difference can be given to the left channel signal and the right channel signal in addition to the convolution process of the impulse response by the sound image localization filters 141L, 141R. Therefore, the accuracy of the sound image localization process enhances according to the sound image localization processing unit 14M1. Furthermore, the sound image can be smoothly moved by continuously changing the level of the level controllers 143L, 143R.

Detailed description on changing the sound image localization position according to such configuration is described in International Publication No. 02/065814 pamphlet by the applicant of the subject invention, and thus will be omitted herein.

(a2. Second Variant)

Figure 5:
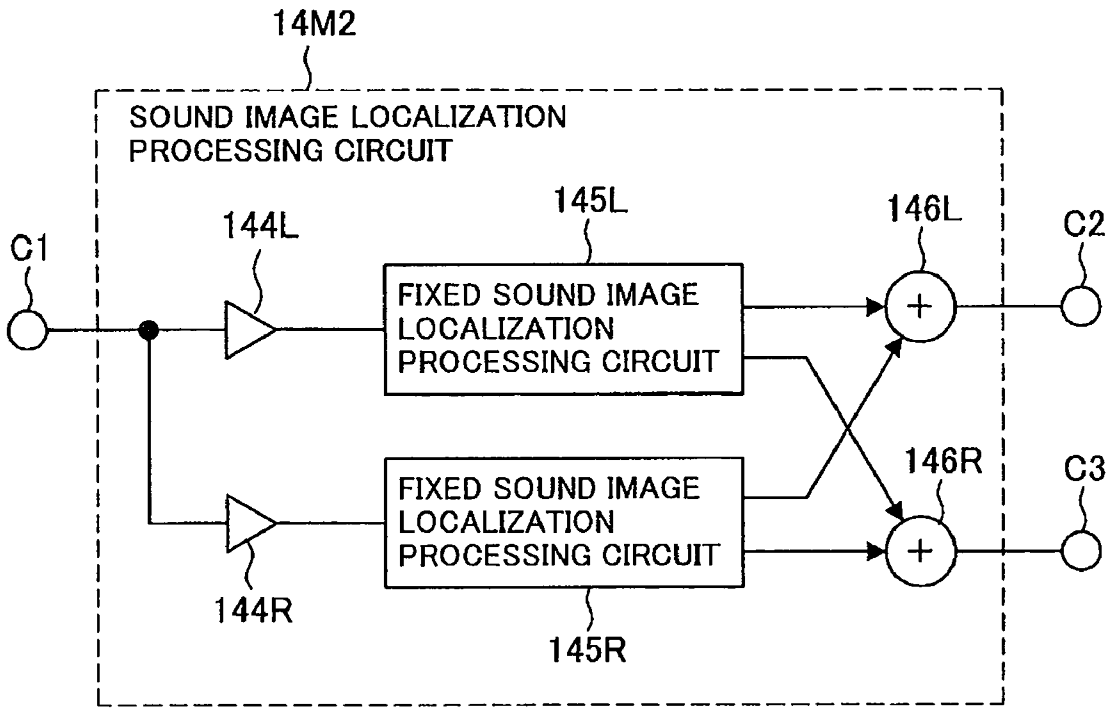
FIG. 5 is an explanatory view describing a second variant of a configuration of the sound image localization processing unit according to the embodiment.

A sound image localization processing unit 14M2 according to a second variant is shown in FIG. 5.

As shown in FIG. 4, the sound image localization processing unit 14M2 according to the second variant includes level controllers 144L, 144R, fixed sound image localization processing circuits 145L, 145R, and adders 146L, 146R.

The level controllers 144L, 144R are respectively connected to the volume varying unit 13. Each level controller 144L, 144R provides a level difference to the audio signal from the volume varying unit 13. The level of the level controllers 144L, 144R is changed by the control unit 17.

The fixed sound image localization processing circuits 145L, 145R are respectively connected to the level controller 144L or the level controller 144R, and sound image localization process the audio signal given level difference from the level controller 144L or the level controller 144R. The fixed sound image localization processing circuits 145L, 145R are configured similar to the sound image localization processing circuit 141 of FIG. 2 or the sound image localization processing circuit 141M of FIG. 4 with fixed sound image localization position.

More specifically, the fixed sound image localization processing circuit 145L is configured by a filter for localizing the sound image at the front side on the left of the listener, and reproduces the impulse response of when localized at the front side on the left of the listener. The fixed sound image localization processing circuit 145R is configured by a filter for localizing the sound image at the front side on the right of the listener, and reproduces the impulse response of when localized at the front side on the right of the listener.

The adder 146L adds the respective left channel signals of the fixed sound image localization processing circuits 145L, 145R, and outputs the resultant to the D/A conversion circuit 151L. The adder 146R adds the respective right channel signals of the fixed sound image localization processing circuits 145L, 145R, and outputs the resultant to the D/A conversion circuit 151R.

According to the sound image localization processing unit 14M2 of the second variant, the level of providing the signal of the input music to each fixed sound image localization processing circuit 145L, 145R can be changed by continuously changing the values of the level controllers 144L, 144R. That is, the level of the audio signal to be allocated to two fixed sound image localization processing circuits 145L, 145R can be changed. Therefore, the localization position of the sound image can be moved by adjusting the balance between the volume of the sound image localized at the front side on the left by the fixed sound image localization processing circuit 145L, and the volume of the sound image localized at the front side on the right by the fixed sound image localization processing circuit 145R.

According to the sound image localization processing unit 14M2 of the second variant having such configuration, the localization position of the sound image can be changed by having the control unit 17 simply change the values of the level controllers 144L, 144R, and thus the circuit configuration is simplified and the time for the sound image localization process can be reduced.

(1-2. Operation of Music Reproducing Device 10)

The music reproducing device 10 according to the present embodiment including different configuration examples of the sound image localization processing unit 14 has been described above. The operation of the music reproducing device 10 according to the present embodiment having the above configuration will now be described with reference to FIGS. 6 to 8. The operation of a case where change in reproduction state of music is at the start of reproduction and at the end of reproduction of music will be described below.

(a. At the Start of Reproduction)

First, the selecting unit 11 selects and acquires the audio signal of the music to be reproduced from the recording device 20, and outputs the audio signal to the reproducing unit 12. The reproducing unit 12 reproduces the audio signal by the operation of the listener or by the setting defined in advance. The reproducing unit 12 switches the reproduction state information from non-reproducing state to in-reproduction, and outputs the reproduction state information to the control unit 17.

Figure 6:
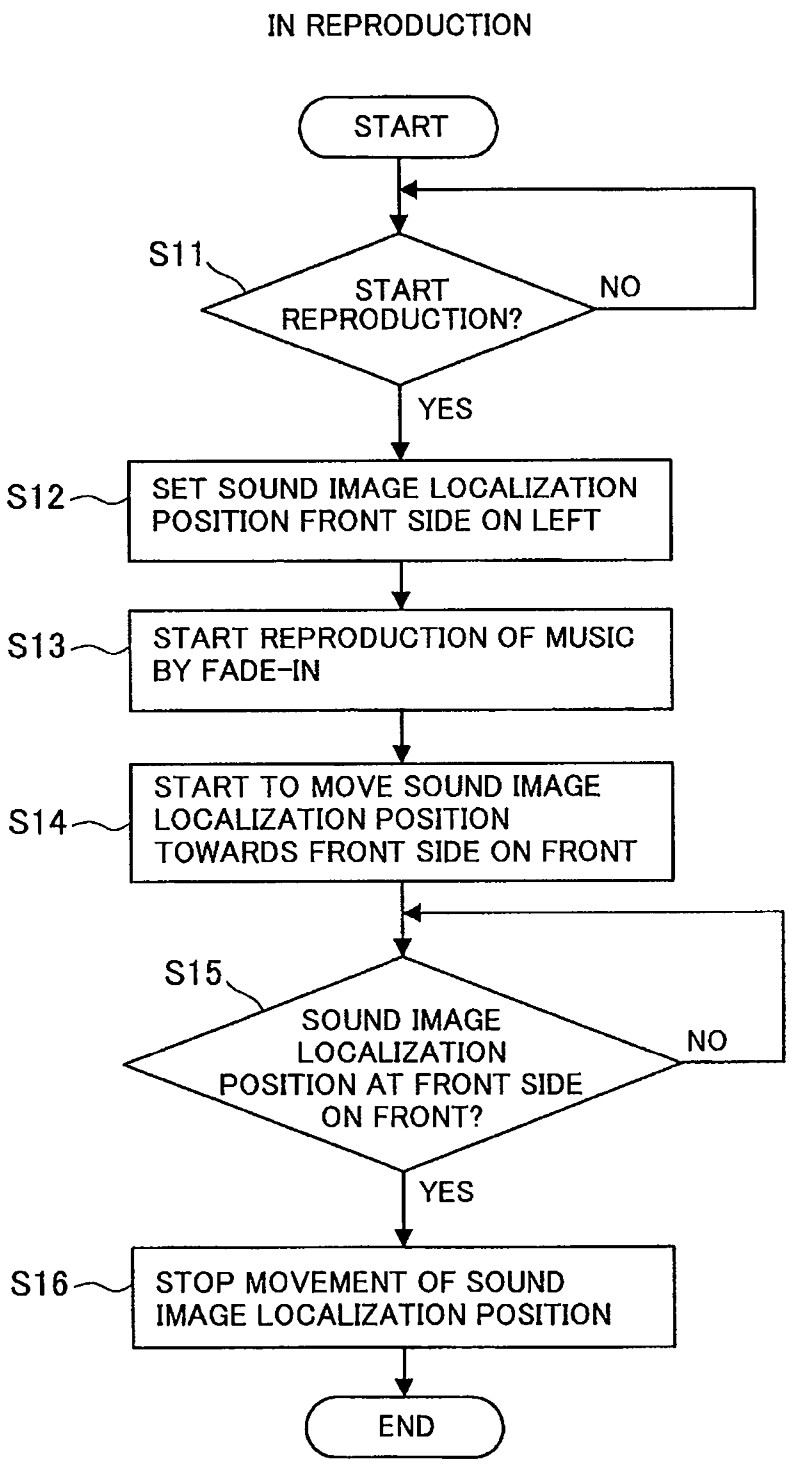
FIG. 6 is a flowchart describing the operation at the start of reproduction of the music reproducing device according to the embodiment.

The operation of the music reproducing device 10 performed at the start of reproduction of the audio is shown in FIG. 6.

In step S11, the sound image localization process determining part 172 acquiring the reproduction state information through the reproduction state acquiring part 171 determines whether or not the reproduction state is changed. More specifically, as shown in FIG. 6, the sound image localization process determining part 172 determines whether or not the reproduction state information has changed from non-reproducing state to in-reproduction, that is, the change in reproduction state is the start of reproduction. If determined as the start of reproduction, the sound image localization process determining part 172 outputs the fade-in signal to the volume changing part 173 and outputs the left approach signal to the localization position changing part 175, and the process proceeds to step S12.

In step S12, the localization position changing part 175 receiving the left approach signal sets the localization position of the sound image of the sound image localization processing unit 14 so as to be at the front side on the left of the listener. More specifically, the localization position changing part 175 first acquires from the coefficient recording part 176 the coefficient value etc. of the FIR filter corresponding to the head related transfer function of having the localization position at the front side on the left. The localization position changing part 175 outputs the coefficient value to the sound image localization processing unit 14, and changes the coefficient etc. of the FIR filter.

After the process of step S12, the process proceeds to step S13, where the volume varying unit 13 adjusts the volume to perform fade-in reproduction with the reproducing unit 12 reproducing the digital data of the music, so that the music is reproduced by fade-in. More specifically, the volume changing part 173 receiving the fade-in signal gradually increases the amplifying amount of the audio signal of the volume varying unit 13 to a predetermined value, and the volume varying unit 13 amplifies the audio signal by such amplifying amount.

After the process of step S13, the process proceeds to step S14, where the localization position changing part 175 moves the localization position of the sound image towards the front side on the front of the user. More specifically, the localization position changing part 175 acquires from the coefficient recording part 176 the coefficient value etc. of the FIR filter corresponding to the head related transfer function of having the position shifted to the front side on the front from the current localization position as the localization position. The localization position changing part 175 outputs the coefficient value to the sound image localization processing unit 14 and changes the coefficient value etc. of the FIR filter. The localization position changing part 175 moves the localization position by repeating such operation.

Step S15 is processed after step S14, that is, with the localization position being moved. In step S15, determination is made on whether or not the localization position is now at the front side on the front of the user by the localization position acquiring part 174 and the localization position changing part 175. More specifically, the localization position acquiring part 174 acquires the localization position information indicating the current localization position, and outputs the same to the localization position changing part 175. The localization position changing part 175 determines whether or not the current localization position represented by the localization position information is at the front side on the front. The process proceeds to step S16 if the localization position changing part 175 determines that the localization position is at the front side on the front.

In step S16, the localization position changing part 175 terminates the changing of the localization position. After the process of step S16, the reproduction of the music is continued with the localization position set at the front side on the front. While steps S11 to S16 are performed, the left channel signal and the right channel signal of the audio signal localization processed by the sound image localization processing unit 14 are provided from the headphone 30 to the listener as sound through the D/A converter 15 and the amplifying unit 16.

Figure 7:
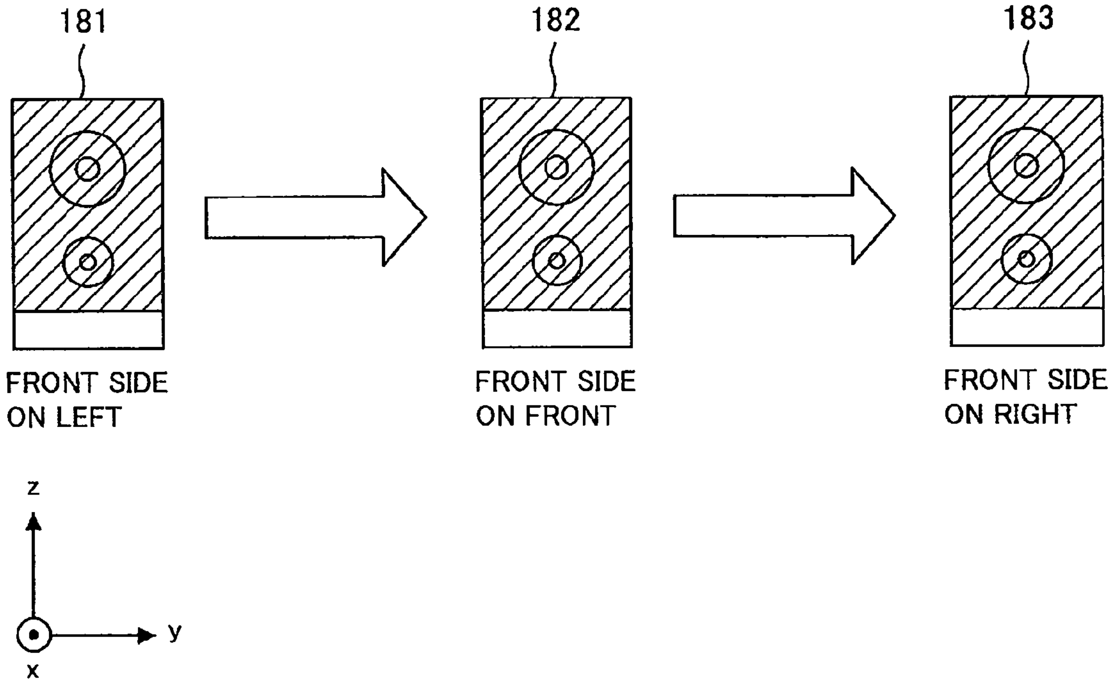
FIG. 7 is an explanatory view conceptually describing a manner in which the sound image localization position moves.

According to the above operation, the music is fade-in reproduced while the localization position of the sound image of the sound listened by the listener at the start of reproduction is moved from the front side on the left to the front side on the front of the listener. The manner in which the sound image moves is shown in frame format in FIG. 7. FIG. 7 is an explanatory view conceptually describing the manner in which the sound image localization position moves.

In FIG. 7, the localization positions 181, 182, 183 of the sound image are shown as speakers in frame format. Furthermore, in FIG. 7, the listener is assumed to be facing the negative direction of the x-axis at the positive position of the x-axis. The negative direction of the y-axis is the left direction for the listener, the positive direction of the y-axis is the right direction for the listener, the positive direction of the z-axis is the upward direction for the listener, and the negative direction of the z-axis is the downward direction for the listener.

At the start of reproduction, the localization position of the sound image is set at the front side on the left of the listener, that is, at the localization position 181. The sound image of the music moves towards the front side on the front while the music is being fade-in reproduced.

The sound image of the music continues to move, and moves to the localization position 182 at the front side on the front of the user. The sound image stops at the localization position 182, and the reproduction of the music continues.

(b. At the End of Reproduction)

The operation of the music reproducing device 10 at the start of reproduction has been described above.

The operation of the music reproducing device 10 at the end of reproduction will now be described.

First, when the reproduction of the music is ended or the end of reproduction of the music is selected by an external control device during reproduction of the music, that is, during reproduction of the reproduction state information output by the reproducing unit 12, the reproducing unit 12 switches the reproduction state from in-reproduction to non-reproducing state, and outputs the reproduction state to the control unit 17.

Figure 8:
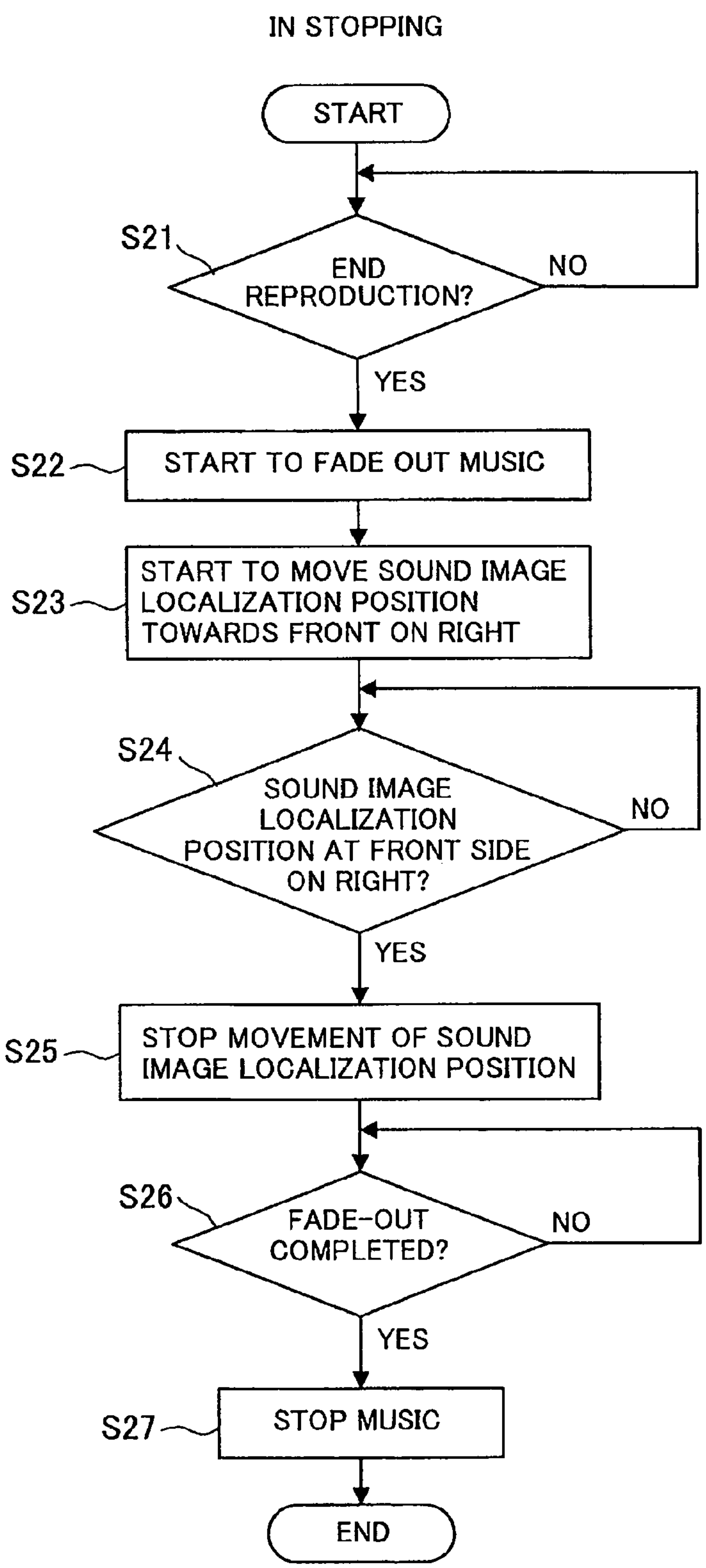
FIG. 8 is a flowchart describing the operation at the end of reproduction of the music reproducing device according to the embodiment.

The operation of the music reproducing device 10 performed at the end of reproduction of the audio is shown in FIG. 8. In step S21, the sound image localization process determining part 172 acquiring the reproduction state information through the reproduction state acquiring part 171 determines whether or not the reproduction state is changed. More specifically, as shown in FIG. 8, the sound image localization process determining part 172 determines whether or not the reproduction state information has changed from in-reproduction to non-reproducing state, that is, the change in reproduction state is the end of reproduction. If determined as the end of reproduction, the sound image localization process determining part 172 outputs the fade-out signal to the volume changing part 173, and outputs the right recede signal to the localization position changing part 175, and the process proceeds to step S22.

In step S22, the fade-out of the music being reproduced starts. More specifically, the volume changing part 173 receiving the fade-out signal gradually decreases the amplifying amount of the audio signal of the volume varying unit 13, and the volume varying unit 13 amplifies the audio signal by such amplifying amount. The process then proceeds to step S23.

In step S23, the localization position changing part 175 starts to move the localization position of the sound image from the front side on the front of the user towards the front side on the right. More specifically, the localization position changing part 175 acquires from the coefficient recording part 176 the coefficient value etc. of the FIR filter corresponding to the head related transfer function of having the position shifted to the front side on the right from the current localization position as the localization position. The localization position changing part 175 outputs the coefficient value to the sound image localization processing unit 14 and changes the coefficient value etc. of the FIR filter. The localization position changing part 175 moves the localization position by repeating such operation.

Step S24 is processed after step S23, that is, with the localization position being moved. In step S24, determination is made on whether or not the localization position is now at the front side on the right of the user by the localization position acquiring part 174 and the localization position changing part 175. More specifically, the localization position acquiring part 174 acquires the localization position information indicating the current localization position, and outputs the same to the localization position changing part 175. The localization position changing part 175 determines whether or not the current localization position represented by the localization position information is at the front side on the right. The process proceeds to step S25 if the localization position changing part 175 determines that the localization position is at the front side on the right.

In step S25, the localization position changing part 175 terminates the changing of the localization position.

After the process of step S25, the process proceeds to step S26, where the volume changing part 173 determines whether the fade-out by the volume varying unit 13 is completed. The process proceeds to step S27 if determined that the volume varying unit 13 has completed the fade-out.

In step S27, the volume changing part 173 outputs the end signal to the reproducing unit 12 when completing the fade-out, and the reproducing unit 12 stops the reproduction of the digital data of the music when receiving the end signal.

According to the above operation, the music is faded out while the localization position of the sound image of the sound listened by the listener at the end of reproduction is moved from the front side on the front to the front side on the left of the listener.

As shown in FIG. 7, at the end of reproduction, the music is faded out, and the localization position of the sound image set at the front side on the front of the listener, that is, at the localization position 183 is moved towards the front side on the right.

The sound image of the music continues to move, and moves to the localization position 183 at the front side on the right of the user. The sound image stops at the localization position 183, and the reproduction of the music is also ended.

(1-3. Effect of the Music Reproducing Device 10)

The configuration and the operation of the music reproducing device 10 according to the present embodiment have been described above.

According to such music reproducing device 10, the sound image of the music can be moved so as to move closer to the listener from the front side on the left towards the front side on the front of the listener at the start of reproduction, and the sound image of the music can be moved so as to move away from the listener from the fronts side at the front towards the front side on the right of the listener at the end of reproduction.

A completely new start and end state of music reproduction that has not been proposed can be provided to the listener by moving the position of the sound image at the start or at the end of reproduction. That is, on the stage arranged at the front, a feeling as if the performer appears from the left side of the stage while playing music can be provided to the listener by moving the localization position of the sound image from the front side on the left towards the front side on the front at the start of reproduction of the music. Similarly, on the stage, a feeling as if the performer exits to the right side of the stage while playing music can be provided to the listener by moving the localization position of the sound image from the front side on the front towards the front side on the right at the end of reproduction of the music.

The feeling felt by the listener as if the performer is moving on the stage can be further enhanced by fading in the music at the start of reproduction and fading out the music at the end of reproduction.

The listener listening to music etc. hopes to hear more realistic sound quality etc. With higher image quality of television broadcast such as digital high vision and image display apparatus etc. of recent years, higher sound quality is also being demanded in the reproducing device providing audio. However, the listener stereoscopically senses the sound compared to an image from a planar image display device. Thus, realistic feeling in audio is not limited only to sound quality, and is influenced by reproduction of a so-called stereoscopic realistic feeling such as arrangement of sound when actually listened, that is, three-dimensional position of the sound emitting source. The stereoscopic realistic feeling is not only influenced by the localization position of the sound during reproduction, but significantly influences the listener especially when the reproduction state changes such as at the start of reproduction or at the end of reproduction. In other words, various feelings can be given to the listener by improving the three-dimensional arrangement of the sound when the reproduction state changes. According to the music reproducing device 10 of the present embodiment, a realistic sound as if going to an actual stage to listen to music playing or as if the performer is playing the music right in front, which are merely examples, can be provided. In other words, the music reproducing device 10 according to the present embodiment has a performance effect of providing various feelings to the listener.

Various performance effects are achieved by appropriately changing the moving direction of the sound image localization position at the start of reproduction or at the end of reproduction. For instance, at the start of reproduction, a feeling as if the performer is coming closer while circling around the listener can be provided to the listener by moving the localization position so as to move closer while rotating with the head of the listener as the center.

Furthermore, a feeling as if the performer is moving back and force around the listener can be provided to the listener by moving the localization position so as to repeatedly move closer and move away to and from the listener at the start of reproduction.

The performance effects described above are merely examples, and the music reproducing device 10 according to the present embodiment can exhibit various other performance effects.

<2. Second Embodiment>

Figure 9:
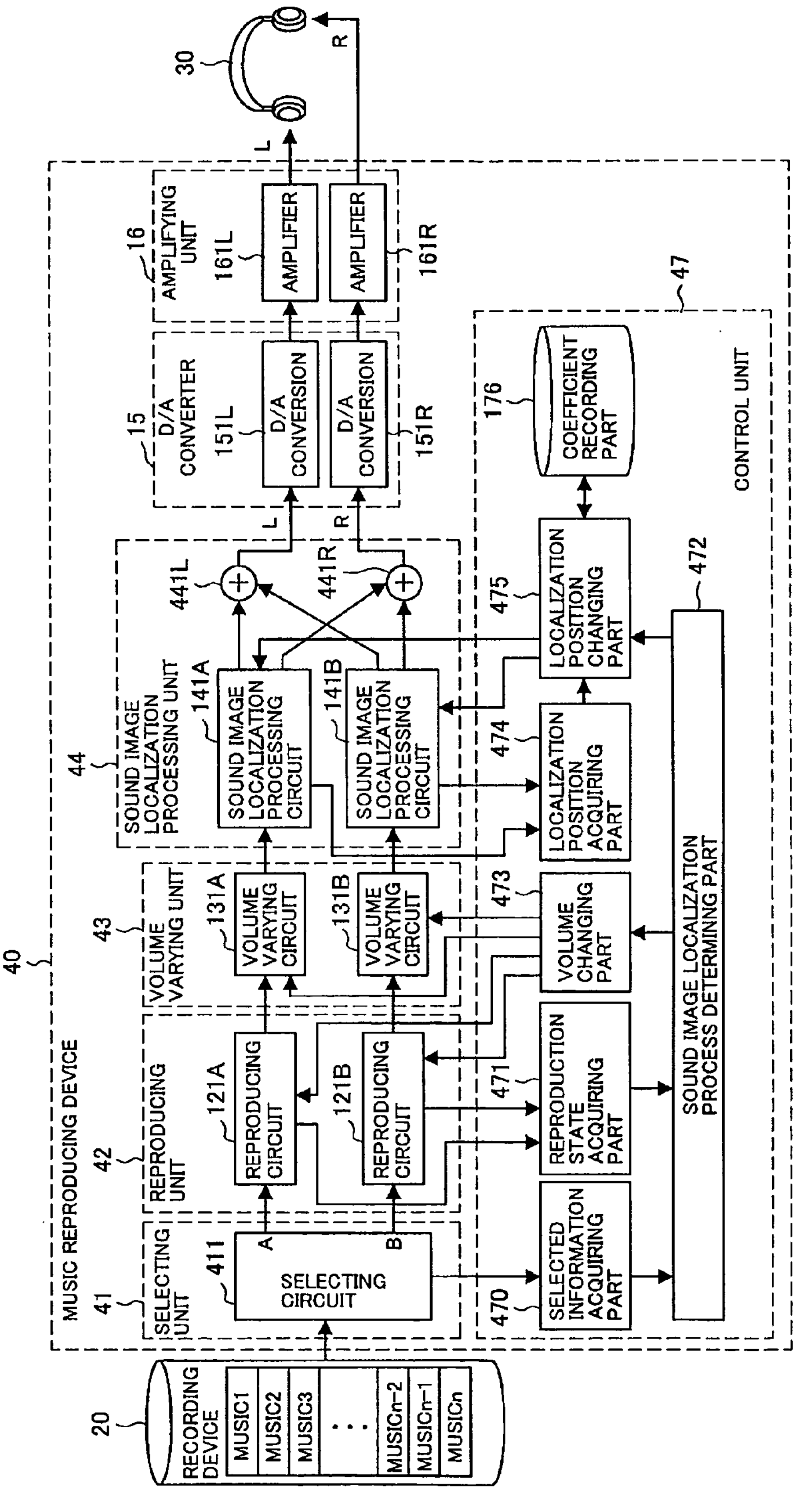
FIG. 9 is an explanatory view describing a configuration of a music reproducing device according to a second embodiment of the present invention.

A music reproducing device according to a second embodiment of the present invention will now be described with reference to FIG. 9. FIG. 9 is an explanatory view describing a configuration of the music reproducing device according to the second embodiment of the present invention.

A music reproducing device 40 according to the present embodiment is an example of an information processing device according to an embodiment of the present invention, and is connected to the recording device 20 and the headphone 30, similar to the music reproducing device 10 according to the first embodiment. The music reproducing device 40 also selects digital data of the music to be reproduced from the recording device 20 and reproduces the same, and provides the sound of the reproduced music to the listener through the headphone 30.

The music reproducing device 40 performs a characteristic operation when changing the music to be reproduced, in addition to the operations similar to those of the music reproducing device 10 according to the first embodiment.

The music reproducing device 40 moves the localization position of the sound image by music according to change in reproduction state of the music, but the music reproducing device 40 also moves the localization position of the sound image by music not only at the start or the end of reproduction of the music but also when switching from reproduction of one music to reproduction of another music. In other words, the music reproducing device 40 also moves the localization position of the sound image by music when changing the music to be reproduced.

The configuration and the operation of the music reproducing device 40 different from those of the music reproducing device 10 according to the first embodiment will be centrally described. A case where "change in reproduction state" is, for example, "change from reproduction of one music to reproduction of another music" will be described below.

Such change in reproduction state is also referred below as "switching" or "switch" of music to be reproduced. The music before and after the change are respectively referred to as first music (first content data) and second music (second content data). That is, the music reproduction device 40 of when ending the reproduction of the first music and starting the reproduction of the second music will be described below.

The first music and the second music of when the music to be reproduced is changed may not be different music. That is, the changing of the reproducing music also includes restarting the reproduction of the same music during the reproduction of the relevant music.

(2-1. Configuration of Music Reproducing Device 40)

As shown in FIG. 9, the music reproducing device 40 includes a selecting unit 41, a reproducing unit 42, a volume varying unit 43, a sound image localization processing unit 44, the D/A converter 15, the amplifying unit 16, and a control unit 47.

In this configuration, the D/A converter 15 and the amplifying unit 16 are the same as in the music reproducing device 10 according to the first embodiment, and thus detailed description thereof will be omitted. The music reproducing device 40 includes two channels to simultaneously process two music. The channels are referred to as Ach and Bch. The music reproducing device 40 includes configurations similar to some of the configurations of the music reproducing device 10 according to the first embodiment for every channel. The same reference numerals as in the first embodiment are denoted for such configurations, and channels are distinguished by denoting A or B representing the respective channel, and the detailed description thereof will be omitted. The similar configuration performs transmission and reception of signal etc. with the control unit 47 in place of the control unit 17.

The selecting unit 41 includes a selecting circuit 411, which selecting circuit 411 is connected to the recording device 20 and the reproducing unit 42. The selecting circuit 411 selects and acquires digital data of the music to be reproduced from the recording device 20, and outputs the acquired digital data to the reproducing unit 42. The selecting circuit 411 may be connected to a separate control device etc. (not shown), so that music can be selected by the operation of the audience or by the setting defined in advance.

The selecting circuit 411 outputs the second music to the Bch when selecting and outputting the second music while reproducing the first music on the Ach. The selecting circuit 411 outputs the second music to the Ach when selecting and outputting the second music while reproducing the first music on the Bch. A case of selecting the second music while reproducing the first music on the Bch are the same as a case of when reproducing the first music on the Ach other than that the channel is merely different. Thus, the case of selecting the second music while reproducing the first music on the Ach will be described below.

The selecting circuit 411 outputs "selected information" to the control unit 47. The "selected information" is information indicating the music selected by the selecting circuit 411, and is one of the information indicating the reproduction state of "which music to select and reproduce". Specifically, during the reproduction of the first music, the name of the music, the identification information, or the like of the first music, and the reproducing order of the first music are output to the control unit 47 as selected information. When the second music is selected, the name of the music, the identification information, or the like of the second music, and the reproducing order of the second music are output to the control unit 47 as selected information. The reproducing order is the order in which the relevant music is reproduced, or the order of the track number etc.

The reproducing unit 42 includes a reproducing circuit 121A for the Ach and a reproducing circuit 121B for the Bch. The reproducing circuits 121A, 121B are configured similar to the reproducing circuit 121 of the first embodiment.

The volume varying unit 43 includes a volume varying circuit 131A for the Ach and a volume varying circuit 131B for the Bch. The volume varying circuits 131A, 131B are configured similar to the volume varying circuit 131 of the first embodiment.

The sound image localization processing unit 44 includes a sound image localization processing circuit 141A for the Ach, a sound image localization processing circuit 141B for the Bch, and adders 441L, 441R. The sound image localization processing circuits 141A, 141B are configured similar to the sound image localization processing circuit 141 of the first embodiment. In this case, however, the left channel signals of the respective sound image localization processing circuits 141A, 141B are output to the adder 441L, and the right channel signals are output to the adder 441R.

The adder 441L adds the left channels signals output from the respective sound image localization processing circuits 141A, 141B, and outputs the added left channel signal to the D/A converter 15. The adder 441R adds the right channel signals output from the respective sound image localization processing circuits 141A, 141B, and outputs the added right channel signal to the D/A converter 15.

The D/A converter 15 and the amplifying unit 16 are configured similar to the D/A converter 15 and the amplifying unit 16 of the first embodiment.

The control unit 47 is connected to the selecting unit 41, the reproducing unit 42, and the volume varying unit 43, and the sound image localization processing unit 44. The control unit 47 operates similar to the control unit 17 of the first embodiment, and changes the volume of the volume varying unit 43 based on the selected information received from the selecting unit 41, that is, the reproduction state of the music, and moves the sound image localization position in the process of the sound image localization processing unit 44.

Specific configuration of the control unit 47 is as described below.

The control unit 17 includes a selected information acquiring part 470, a reproduction state acquiring part 471, a sound image localization process determining part 472, a volume changing part 473, a localization position acquiring part 474, a localization position changing part 475, and the coefficient recording part 176.

The selected information acquiring part 470 is connected to the selecting unit 41 and the sound image localization process determining part 472. The selected information acquiring part 470 acquires the selected information from the selecting unit 41 and outputs the same to the sound image localization process determining part 472.

The reproduction state acquiring part 471 is connected to the reproducing unit 42 and the sound image localization process determining part 472. The reproduction state acquiring part 471 acquires the reproduction state information of the Ach and the Bch from the reproducing unit 42, and outputs the same to the sound image localization process determining part 472.

The sound image localization process determining part 472 is connected to the selected information acquiring part 470, the reproduction state acquiring part 471, the volume changing part 473, and the localization position changing part 475. The sound image localization process determining part 472 appropriately outputs at least one of "fade-in signal" or "fade-out signal" to the volume changing part 473 according to the selected information from the selected information acquiring part 470 or the reproduction state information from the reproduction state acquiring part 471. Furthermore, the sound image localization process determining part 472 appropriately outputs at least one of "left approach signal", "right approach signal", "left recede signal" or "right recede signal" to the localization position changing part 475 according to the change in the selected information or the reproduction state information.

The right approach signal is a signal for moving the localization position of the sound image from the front side on the right of the user towards the front side on the front to move the sound image so as to move closer to the user, and the left recede signal is a signal for moving the localization position of the sound image from the front side on the front of the user towards the front side on the left to move the sound image so as to move away from the user.

More specifically, the sound image localization process determining part 472 operates similar to the first embodiment when the reproduction state information changes. The sound image localization process determining part 472 operates as below when the selected information is changed, that is, when the second music is selected while reproducing the first music on the Ach and the selected information is changed to information indicating the second music.

The sound image localization process determining part 472 first outputs the fade-out signal of the Ach to the volume changing part 473. The sound image localization process determining part 472 then checks the reproducing order of the second music indicated in the selected information, and determines whether the reproducing order is before or after the reproducing order of the first music. The sound image localization process determining part 472 outputs the right recede signal of the Ach and the left approach signal of the Bch to the localization position changing part 475 if the reproducing order of the second music is after the reproducing order of the first music, and outputs the left recede signal of the Ach and the right approach signal of the Bch to the localization position changing part 475 if the reproducing order of the second music is before the reproducing order of the first music. Furthermore, the sound image localization process determining part 472 outputs the fade-in signal of the Bch to the volume changing part 473.

The volume changing part 473 is connected to the sound image localization process determining part 472 and the volume varying unit 43. The volume changing part 473 changes the volume of the volume varying unit 43, that is, the amplifying amount of the audio signal based on the fade-in signal or the fade-out signal of the Ach or the Bch from the sound image localization process determining part 472.

More specifically, the volume changing part 473 decreases the amplifying amount of the Ach of the volume varying unit 13, that is, the amplifying amount of the volume varying circuit 131A to approximately zero when receiving the fade-out signal of the Ach. The volume changing part 473 increases the amplifying amount of the Bch of the volume varying unit 13, that is, the amplifying amount of the volume varying circuit 131B to a predetermined magnitude when receiving the fade-in signal of the Bch.

When receiving the fade-out signal of the Ach and decreasing the amplifying amount of the Ach of the volume varying unit 13 to approximately zero, the volume changing part 473 outputs the "end signal" to the reproducing unit 42 (i.e., reproducing circuit 121A) to end the reproduction of the Ach when the amplifying amount of the volume varying unit 43 of the Ach becomes approximately zero. When receiving the fade-out signal of the Bch and decreasing the amplifying amount of the Bch of the volume varying unit 13 to approximately zero, the volume changing part 473 outputs the "end signal" to the reproducing unit 42 (i.e., reproducing circuit 121B) to end the reproduction of the Bch when the amplifying amount of the volume varying unit 43 of the Bch becomes approximately zero.

The localization position acquiring part 474 is connected to the sound image localization processing unit 44, and the localization position changing part 475. The localization position acquiring part 474 acquires the information (hereinafter referred to as "localization position information") indicating the localization position of the sound image in the sound image localization process performed by the sound image localization processing unit 44 of the Ach and the Bch, and outputs the same to the localization position changing part 475. The localization position corresponds to the coefficient value based on the head related transfer function as described above. Therefore, the localization position acquiring part 474 may acquire the coefficient value as localization position information.

The localization position changing part 475 is connected to the sound image localization process determining part 472, the localization position acquiring part 474, and the coefficient recording part 176. The localization position changing part 475 moves the localization position of the sound image in the sound image localization process of the sound image localization processing unit 44 based on the left approach signal etc. of the Ach or the Bch from the sound image localization process determining part 472.

More specifically, a plurality of coefficient values of the head related transfer function corresponding to the desired localization position is stored in the coefficient recording part 176 in advance. When receiving the right recede signal etc. of the Ach, the localization position changing part 475 acquires from the coefficient recording part 176 the coefficient value of the head related transfer function for moving the localization position in a direction indicated by the relevant signal, and outputs the same to the Ach of the sound image localization processing unit 44 (i.e., sound image localization processing circuit 141A). The sound image localization processing unit 44 moves the localization position by changing the coefficient values of the coefficient multipliers $T_{11}$ to $T_{1n+1}$ of the FIR filter of the sound image localization processing circuit 141A to the received coefficient values.

When receiving the left approach signal etc. of the Bch, the localization position changing part 475 acquires from the coefficient recording part 176 the coefficient value of the head related transfer function for moving the localization position in a direction indicated by the relevant signal, and outputs the same to the Bch of the sound image localization processing unit 44 (i.e., sound image localization processing circuit 141B). The sound image localization processing unit 44 moves the localization position by changing the coefficient values of the coefficient multipliers $T_{11}$ to $T_{1n+1}$ of the FIR filter of the sound image localization processing circuit 141B to the received coefficient values.

In this case, the localization position changing part 475 may change the localization position while determining whether the localization position has moved to the desired localization position based on the localization position information of each channel from the localization position acquiring part 474.

(a. Other Configuration Examples of the Sound Image Localization Processing Unit 44)

The configuration of the music reproducing device 40 according to the present embodiment has been described above.

A case where the sound image localization processing unit 44 includes the sound image localization processing circuits 141A, 141B and the adders 441L, 441R has been described above, but the present invention is not limited to such example. Other configuration examples of the sound image localization processing unit 44 will be described prior to describing the operation of the music reproducing device 40 according to the present embodiment.

Figure 10:
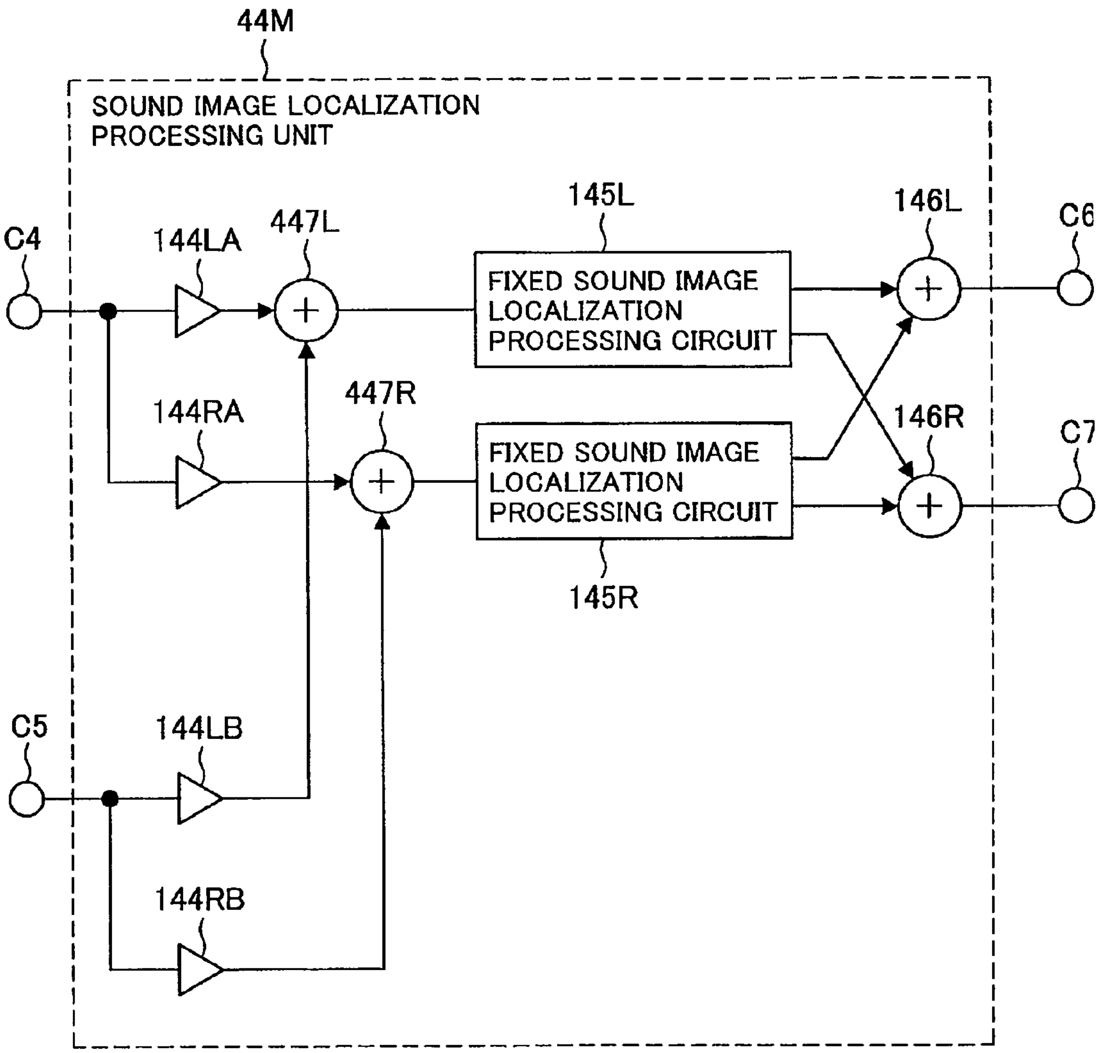
FIG. 10 is an explanatory view describing another example of the configuration of the sound image localization processing unit.

The configuration of a sound image localization processing unit 44M according to another configuration example is shown in FIG. 10.

As shown in FIG. 10, the sound image localization processing unit 44M includes level controllers 144LA, 144RA for the Ach, level controllers 144LB, 144RB for the Bch, adders 447L, 447R, fixed sound image localization processing circuits 145L, 145R, and adders 146L, 146R.

The level controllers 144LA, 144RA are respectively connected to the Ach (i.e., volume varying circuit 131A) of the volume varying unit 43. Each level controller 144LA, 144RA provides a level difference to the audio signal from the Ach of the volume varying unit 13. The level controllers 144LB, 144RB are respectively connected to the Bch (i.e., volume varying circuit 131B) of the volume varying unit 43. Each level controller 144LB, 144RB provides a level difference to the audio signal from the Bch of the volume varying unit 13.

The level of the level controllers 144LA, 144RA, 144LB, 144RB is changed by the control unit 47.

The adder 447L is connected to the level controller 144LA and the level controller 144LB, and adds the audio signals with level difference. The adder 447R is connected to the level controller 144RA and the level controller 144RB, and adds the audio signals with level difference.

The fixed sound image localization processing circuits 145L, 145R are respectively connected to the adder 447L or the adder 447R, and sound image localization processes the added audio signal from the adder 447L or the adder 447R. The fixed sound image localization processing circuits 145L, 145R are configured similar to the fixed sound image localization processing circuits 145L, 145R according to the first embodiment, and the adders 146L, 146R are configured similar to the adders 146L, 146R of the first embodiment.

According to the sound image localization processing unit 44M of such other configuration example, the level of providing the signal of the music of the Ach to each fixed sound image localization processing circuit 145L, 145R can be changed by continuously changing the values of the level controllers 144LA, 144RA. The level of providing the signal of the music of the Bch to each fixed sound image localization processing circuit 145L, 145R can be changed by continuously changing the values of the level controllers 144LB, 144RB. That is, the level of the audio signal to be allocated to the two fixed sound image localization processing circuits 145L, 145R can be changed for every channel. Therefore, the localization position of the sound image can be moved by adjusting the balance between the volume of the sound image localized at the front side on the left by the fixed sound image localization processing circuit 145L, and the volume of the sound image localized at the front side on the right by the fixed sound image localization processing circuit 145R. Furthermore, the channels can be switched by changing the input level to each fixed sound image localization processing circuit 145L, 145R for every channel.

According to the sound image localization processing unit 44M of such configuration example, the music to be reproduced can be switched from the first music to the second music while changing the localization position of the sound image by simply changing the values of the level controllers 144LA, 144RA, 144LB, and 144RB by the control unit 17, and thus the time for sound image localization process can be reduced. Furthermore, the sound image can be smoothly moved by continuously changing the levels of the level controllers 144LA, 144RA, 144LB, and 144RB.

(2-2. Operation of Music Reproducing Device 40)

The music reproducing device 40 according to the present embodiment including the configuration example of the sound image localization processing unit 44 has been described above. The operation of the music reproducing device 40 according to the present embodiment having the above configuration will now be described with reference to FIGS. 11 to 12. The music reproducing device 40 can operate based on the reproduction state information, similar to the music reproducing device 10 of the first embodiment. A case where change in reproduction state is the switching of the music to be reproduced will be described below.

First, the selecting unit 41 selects and acquires the audio signal of the second music to be newly reproduced from the recording device 20 while the first music is being reproduced using the Ach, and outputs the audio signal to the reproducing unit 42. In this case, the selected information output from the selecting unit 41 to the control unit 47 is switched from the information indicating the first music to the information indicating the second music.

Figure 11:
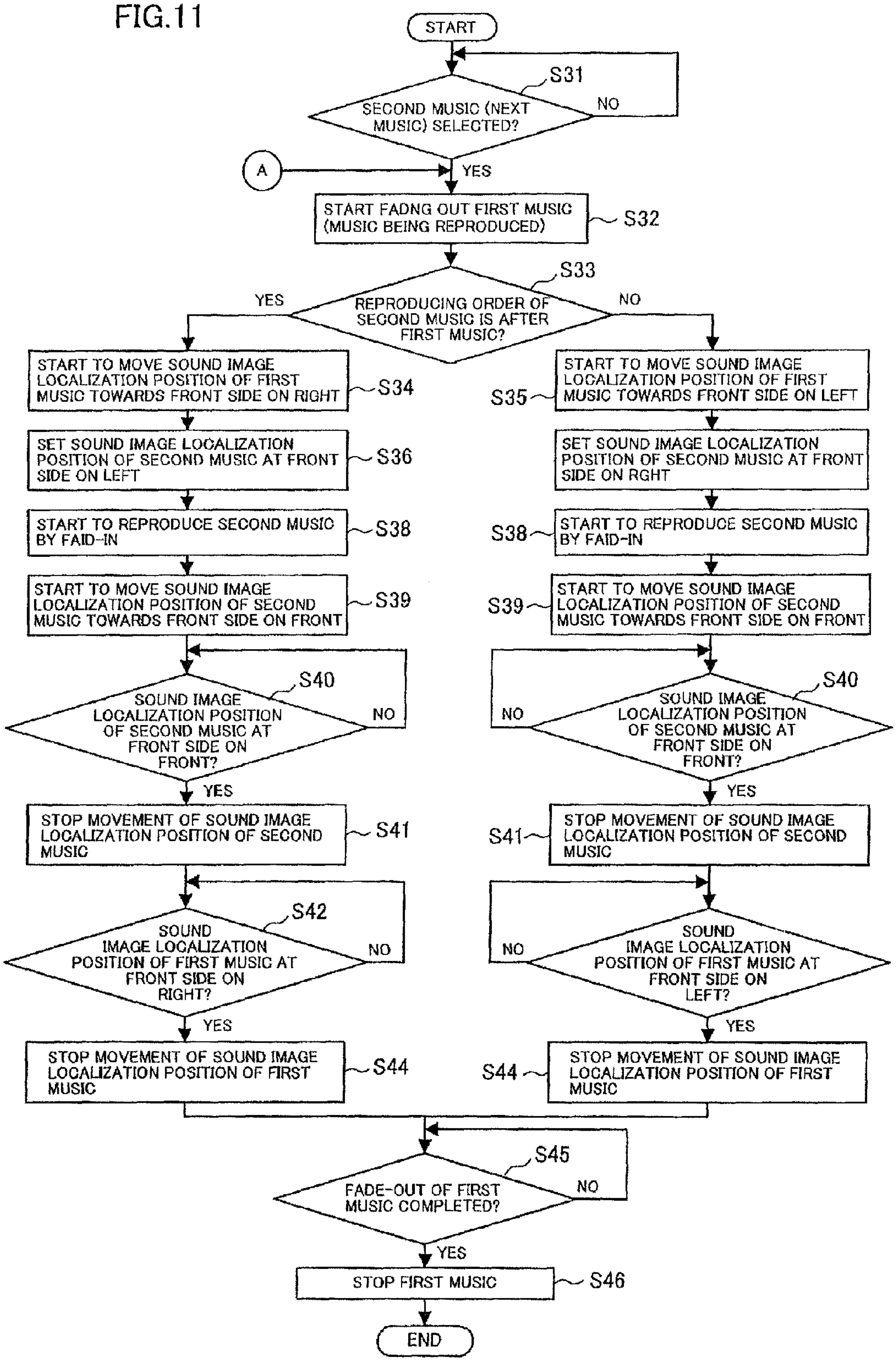
FIG. 11 is a flowchart describing the operation in switching the music of the music reproducing device according to the embodiment.

In step S31, the sound image localization process determining part 472 acquiring the selected information through the selected information acquiring part 470 determines whether or not the reproduction state is changed. More specifically, as shown in FIG. 11, the sound image localization process determining part 472 determines whether or not the selected information changed from the information indicating the first music to the information indicating the second music. The process proceeds to step S32 if the sound image localization process determining part 472 determines that the second music, that is, a new music is selected.

In step S32, the sound image localization process determining part 472 outputs the fade-out signal (fade-out signal of Ach) of the first music, that is, the currently reproducing music to the volume changing part 473. The volume changing part 473 gradually decreases the amplifying amount of the volume varying unit 43 (i.e., volume varying circuit 131A) of the Ach or the channel of the first music, and starts to fade out the first music.

After the process of step S32, the process proceeds to step S33, and the sound image localization process determining part 472 checks the reproducing order of the second music contained in the selected information, where the process proceeds to step S34 if determined that the relevant reproducing order of the second music is after the reproducing order of the first music. The process proceeds to step S35 if the sound image localization process determining part 472 determines that the reproducing order of the second music is before the reproducing order of the first music.

(a. When Reproducing Order of Second Music is Before First Music)

In step S34, the localization position changing part 475 starts to move the localization position of the sound image of the first music from the front side on the front of the user towards the front side on the right. More specifically, the sound image localization process determining part 472 outputs the right recede signal of the Ach to the localization position changing part 475. The localization position changing part 475 receiving the signal acquires from the coefficient recording part 176 the coefficient value etc. of the FIR filter corresponding to the head related transfer function of having the position shifted to the front side on the right from the current localization position as the localization position. The localization position changing part 475 outputs the coefficient value to the Ach of the sound image localization processing unit 44 and changes the coefficient value etc. of the FIR filter. The localization position changing part 475 moves the localization position of the Ach by repeating such operation.

The process proceed to step S36 after the process of step S34, and the localization position changing part 475 sets the localization position of the sound image of the second music of the sound image localization processing unit 44 so as to be at the front side on the left of the listener. More specifically, the sound image localization process determining part 472 outputs the left approach signal of the Bch to the localization position changing part 475. The localization position changing part 475 receiving the signal acquires from the coefficient recording part 176 the coefficient value etc. of the FIR filter corresponding to the head related transfer function of having the localization position of the Bch at the front side on the left. The localization position changing part 475 outputs the coefficient value to the sound image localization processing unit 44 and changes the coefficient value etc. of the FIR filter.

The process proceeds to step S38 after the process of step S36, and the volume varying unit 43 adjusts the volume of the Bch for fade-in reproduction while the reproducing unit 42 is reproducing the digital data of the second music, so that the second music is reproduced by fade-in. More specifically, the sound image localization process determining part 472 outputs the fade-in signal of the Bch to the volume changing part 473. The volume changing part 473 receiving the signal gradually increases the amplifying amount (volume varying circuit 131B) of the Bch of the audio signal of the volume varying unit 43 to a predetermined value, and the volume varying unit 43 amplifies the audio signal of the Bch by such amplifying amount.

The process proceeds to step S39 after the process of step S38, and the localization position changing part 475 moves the localization position of the sound image of the second music towards the front side on the front of the user. More specifically, the localization position changing part 475 acquires from the coefficient recording part 176 the coefficient value etc. of the FIR filter corresponding to the head related transfer function of having the position shifted to the front side on the front from the current localization position as the localization position. The localization position changing part 475 outputs the coefficient value to the Bch of the sound image localization processing unit 44 and changes the coefficient value etc. of the FIR filter. The localization position changing part 475 moves the localization position of the Bch by repeating such operation.

Step S40 is processed after step S39, that is, with the localization position of Bch being moved. In step S40, determination is made on whether or not the localization position of the second music is now at the front side on the front of the user by the localization position acquiring part 474 and the localization position changing part 475. More specifically, the localization position acquiring part 474 acquires the localization position information indicating the current Bch localization position, and outputs the same to the localization position changing part 475. Furthermore, the localization position changing part 475 determines whether or not the current Bch localization position represented by the localization position information is at the front side on the front. The process proceeds to step S41 if the localization position changing part 475 determines that the localization position of the Bch is at the front side on the front.

In step S41, the localization position changing part 475 terminates the changing of the localization position of the second music. After the process of step S41, the reproduction of the second music is continued with the localization position of the Bch set at the front side on the front. The process then proceeds to step S42.

In step S42, determination is made on whether or not the localization position of the first music is now at the front side on the right of the user by the localization position acquiring part 474 and the localization position changing part 475. More specifically, the localization position acquiring part 474 acquires the localization position information indicating the current Ach localization position, and outputs the same to the localization position changing part 475. Furthermore, the localization position changing part 475 determines whether or not the current Ach localization position represented by the localization position information is at the front side on the right. The process proceeds to step S44 if the localization position changing part 475 determines that the localization position of the Ach is at the front side on the left.

In step S44, the localization position changing part 475 terminates the changing of the localization position of the first music.

The process proceeds to step S45 after the process of step S44, and the volume changing part 473 determines whether the fade-out of the first music, that is, Ach by the volume varying unit 43 is completed. The process proceeds to step S46 if determined that the volume varying unit 43 has completed the fade-out of the first music.

In step S46, the volume changing part 473 outputs the end signal to the Ach of the reproducing unit 42 when completing the fade-out, and the reproducing unit 42 stops the reproduction of the digital data of the first music when receiving the end signal of the Ach.

It can be recognized that while steps S31 to S46 are being performed, the left channel signal and the right channel signal of the audio signals of the first music and the second music localization processed by the sound image localization processing unit 44 are provided from the head phone 30 to the listener through the D/A converter 15 and the amplifying unit 16 as sound.

Figure 12:
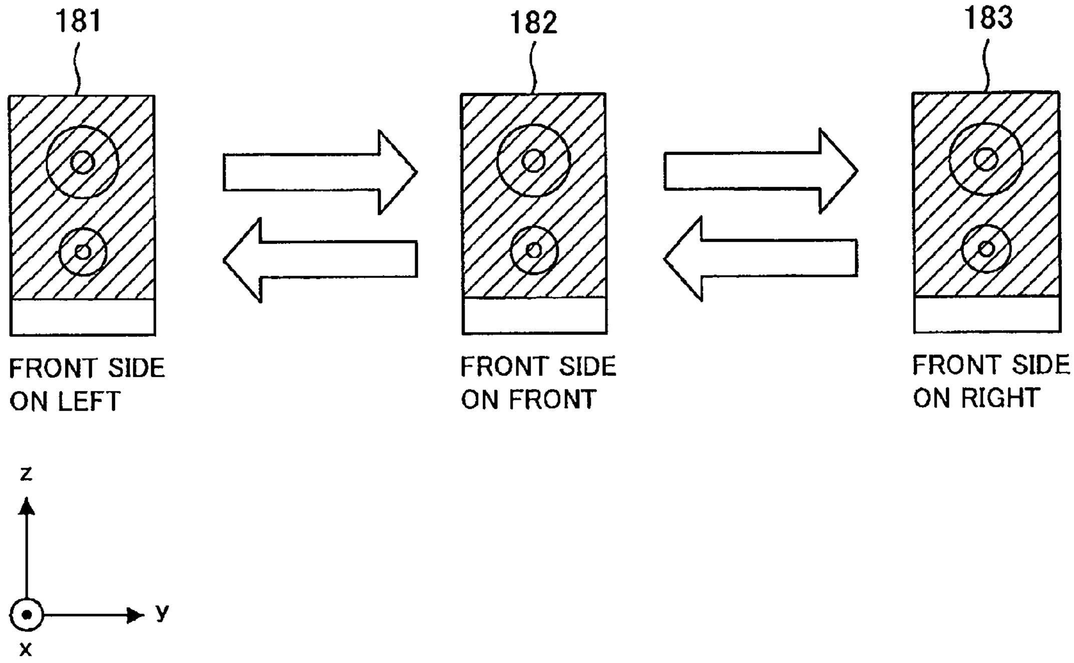
FIG. 12 is an explanatory view conceptually describing a manner in which the sound image localization position moves.

According to the above operation, the first music and the second music are so-called cross-faded, and switched while having the sound image moved. The manner in which the sound image moves is shown in frame format in FIG. 12. FIG. 12 is an explanatory view conceptually describing the manner in which the sound image localization position moves.

In FIG. 12, the localization positions 181, 182, 183 of the sound image are shown as speakers in frame format. Furthermore, in FIG. 12, the listener is assumed to be facing the negative direction of the x-axis at the positive position of the x-axis. The negative direction of the y-axis is the left direction for the listener, the positive direction of the y-axis is the right direction for the listener, the positive direction of the z-axis is the upward direction for the listener, and the negative direction of the z-axis is the downward direction for the listener.

As shown in FIG. 12, the first music is faded out, and the localization position of the sound image of the first music set at the front side on the front of the listener, that is, at the localization position 182 moves to the front side on the right. At the same time, the localization position of the sound image of the second music is set at the front side on the left of the listener, that is, at the localization position 181. The sound image of the second music is moved to the front side on the front while the second music is being fade-in reproduced.

The sound image of the first music continues to move, and moves to the localization position 183 at the front side on the right of the user. The sound image of the first music stops at the localization position 183, and the reproduction of the first music is ended. The sound image of the second music also continues to move, and moves to the localization position 182 at the front side on the front of the user. The sound image stops at the localization position 182, and the reproduction of the second music continues.

(b. When Reproducing Order of Second Music is after First Music)

The operation of steps S35 to S46 are carried out when the sound image localization process determining part 472 determines that the reproducing order of the second music is before the reproducing order of the first music in step S33. However, in such operation, the operations other than that the moving direction of the first music and the second music become opposite are the same as the operations of when the reproducing order of the second music is before the reproducing order of the first music.

That is, the sound image of the first music moves from the front side on the front towards the front side on the left, and the sound image of the second music moves from the front side on the right towards the front side on the left. More specifically, the sound image localization process determining part 472 outputs the left recede signal to the Ach of the localization position changing part 475, and outputs the right approach signal to the Bch. Other operations have been described in detail above, and thus will be omitted.

(2-3. Effect of Music Reproducing Device 40)

The configuration and the operation of the music reproducing device 40 according to the present embodiment have been described above.

According to the music reproducing device 40, the following effects are obtained in addition to the effects of the music reproducing device 10 according to the first embodiment.

In other words, according to the music reproducing device 40, the first music and the second music can be switched by moving the second music from the front side on the left (or front side on the right) to the front side on the front while moving the first music from the front side on the right (or front side on the left). Therefore, the sound image of the first music and the sound image of the second music are prevented from overlapping when switching the first music and the second music so as not to create a silent state. Thus, the switching of the music to be reproduced can be smoothly carried out. The listener can hear out the sound of the first music and the sound of the second music by the spatial separation.

A completely new reproducing music switching method is thus proposed to the listener by moving the sound image positions of the music while being spatially spaced apart. That is, reproduction of music by a completely new switching method as if, on the stage arranged in front of the listener, the performer of the first music exits from the center of the stage towards the right side of the stage, and the performer of the next second music appears from the left side of the stage towards the center of the stage is achieved.

Furthermore, according to the music reproducing device 40, if the reproducing order of the second music is after the reproducing order of the first music, the sound images by both music can be moved toward the right of the listener, and if the reproducing order of the second music is before the reproducing order of the first music, the sound image by both music can be moved towards the left of the listener. Thus, the listener can recognize from the moving direction of the sound images whether the music is being reproduced in the reproducing order or the music reverse in the reproducing order is being reproduced.

The first music and the second music can be cross-fade reproduced with respect to each other, the switching of the music can be more smoothly carried out, and a silent state is prevented from being created.

Therefore, according to the music reproducing device 40 of the present embodiment, various performance effects are achieved when reproducing the music and providing the same to the user. However, the performance effects described above are merely examples, and the music reproducing device 40 according to the present embodiment can exhibit various other performance effects.

<3. Third Embodiment>

Figure 13:
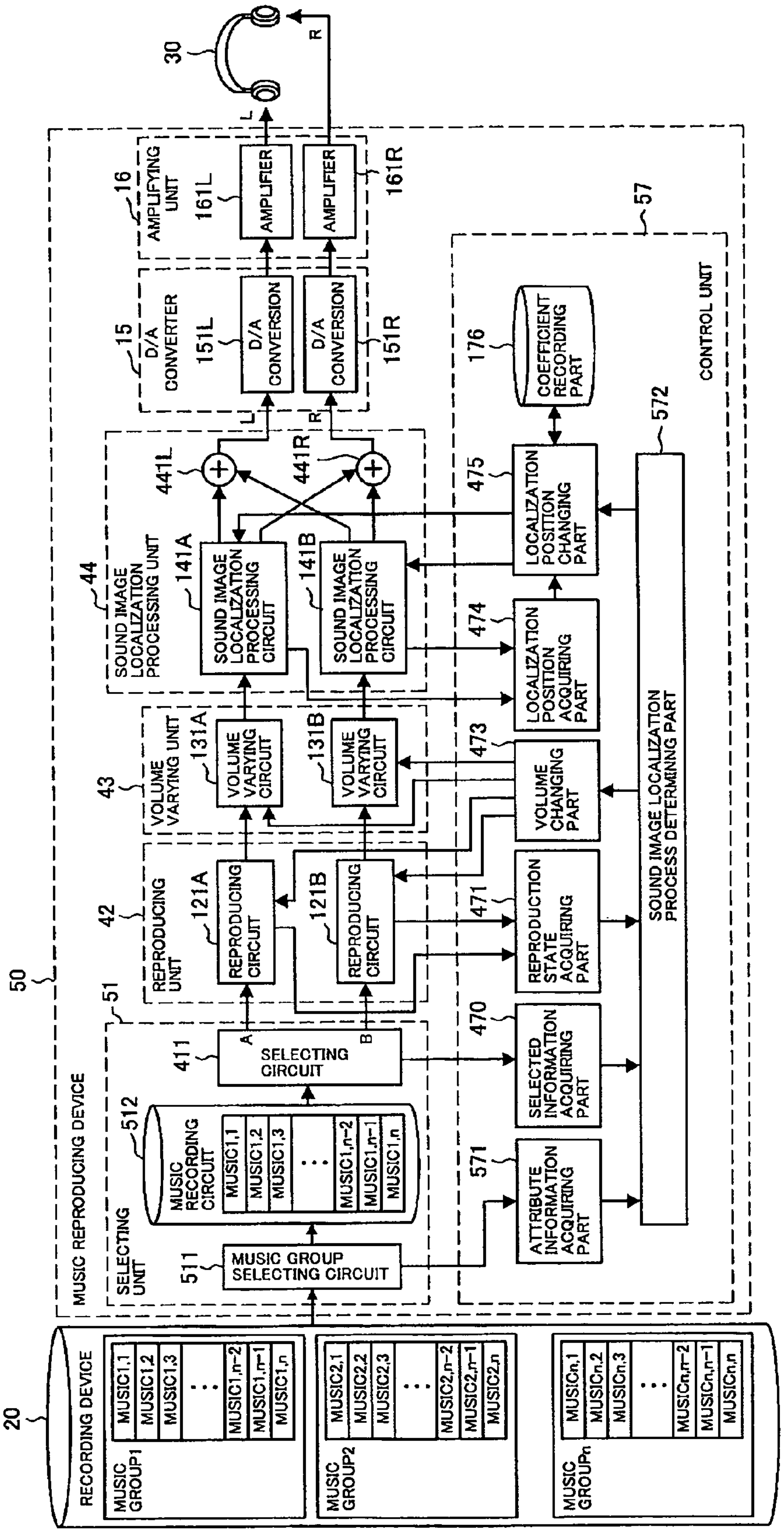
FIG. 13 is an explanatory view describing a configuration of a music reproducing device according to a third embodiment of the present invention.

A music reproducing device according to the third embodiment of the present invention will now be described with reference to FIG. 13. FIG. 13 is an explanatory view describing a configuration of the music reproducing device according to the third embodiment of the present invention.

A music reproducing device 50 according to the present embodiment is an example of an information processing device according to an embodiment of the present invention, and is connected to the recording device 20 and the headphone 30, similar to the music reproducing devices 10, 40 according to the first and the second embodiments. The music reproducing device 50 also selects digital data of the music to be reproduced from the recording device 20 and reproduces the same, and provides the sound of the reproduced music to the listener through the headphone 30.

In addition to the operation similar to the music reproducing device 40 according to the second embodiment, the music reproducing device 50 has a plurality of methods for selecting the reproducing music, and performs a characteristic operation when switching the reproducing music to the music selected through the selecting method. That is, the music reproducing device 50 performs a characteristic operation according to the method of selecting the next music to reproduce when the reproducing music is switched as change in reproduction state.

More specifically, as shown in FIG. 13, attribute information is given to each of a plurality of music recorded in the recording device 20. The "attribute information" is various information such as genre of music, name of artist, name of recorded album, reproduction frequency of music, popularity stakes of music, region where music is created, reproduction time of music, provider of music, sex of artist, and the like. Similar to the case of the second embodiment, a case of selecting the second music while reproducing the first music will be described, where the music reproducing device 40 has a plurality of selecting methods as a method of selecting the second music in a relationship between attribute of second music group and attribute of first music group. That is, the selecting method includes a method of selecting the second music from the same artist but from a different recorded album, a method of selecting the second music from the music of the same artist and the same recorded album, a method of selecting the second music from the music of the same artist, the same recorded album, and of the same popularity stake, and the like.

For the sake of convenience of description, a case where the attribute information is recorded album, and the music reproducing device 40 has two methods of a method of selecting music from the same album and a method of selecting music from a different album as a method of selecting the second music will be described. The recorded album is hereinafter also referred to as "music group" (group etc.). That is, as shown in FIG. 13, a case where the first music group to $n^{th}$ music group respectively contains a plurality of music (e.g., music 1, 1 to music 1, n in first music group), and "music group" is associated with the music as attribute information will be described.

The music reproducing device 50 according to the present embodiment moves the localization position of the sound image by music according to change in reproduction state of switching the reproducing music. However, one of the features of the music reproducing device 50 is to differ the moving direction of the localization position for every method of selecting the next music. The music reproducing device 50 having such feature will be described in detail below.

(3-1. Configuration of Music Reproducing Device 50)

As shown in FIG. 13, the music reproducing device 50 includes a selecting unit 51, the reproducing unit 42, the volume varying unit 43, the sound image localization processing unit 44, the D/A converter 15, the amplifying unit 16, and a control unit 57.

In such configuration, the configurations other than of the selecting unit 51 and the control unit 57 are similar to the music reproducing device 40 of the second embodiment, and thus the detailed description will be omitted. The similar configuration performs transmission and reception of signal etc. with the control unit 57 in place of the control unit 47.

The selecting unit 51 includes a music group selecting circuit 511, a music recording circuit 512, and the selecting circuit 411.

The music group selecting circuit 511 is connected to the recording device 20, the music recording circuit 512, and the control unit 57. The music group selecting circuit 511 selects and acquires digital data of one or more music contained in the music group to which the music to be reproduced belongs from the recording device 20, and outputs the acquired digital data to the music recording circuit 512. The music group selecting circuit 511 outputs the attribute information of the selected music group to the control unit 57. The music group selecting circuit 511 may be connected to a separate control device etc. (not shown), so that music group can be selected by the operation of the audience or by the setting defined in advance.

The music recording circuit 512 is connected to the music group selecting circuit 511 and the selecting circuit 411. The music recording circuit 512 records the digital data of one or more music contained in the music group output by the music group selecting circuit 511. The selecting circuit 411 then selects the music to reproduce from the music recorded by the music recording circuit 512.

The control unit 57 is connected to the selecting unit 51, the reproducing unit 42, the volume varying unit 43, and the sound image localization processing unit 44. The control unit 57 performs operations similar to the control unit 47 of the second embodiment, and also changes the moving direction of the sound image localization position in the process of the sound image localization processing unit 44 based on the attribute information received from the selecting unit 41.

Specific configuration of the control unit 57 is as described below.

The control unit 57 includes an attribution information acquiring part 571, the selected information acquiring part 470, the reproduction state acquiring part 471, a sound image localization process determining part 572, the volume changing part 473, the localization position acquiring part 474, the localization position changing part 475, and the coefficient recording part 176.

In such configuration, configurations other than the attribute information acquiring part 571 and the sound image localization process determining part 572 are similar to the music reproducing device 40 of the second embodiment, and thus the detailed description thereof will be omitted. The similar configuration performs transmission and reception of signal etc. with the sound image localization process determining part 572 in place of the sound image localization process determining part 472.

The attribute information acquiring part 571 is connected to the selecting unit 571 and the sound image localization process determining part 572. The attribute information acquiring part 571 acquires the attribute information from the selecting unit 51 and outputs the same to the sound image localization process determining part 572.

The sound image localization process determining part 572 is connected to the attribute information acquiring part 571, the selected information acquiring part 470, reproduction state acquiring part 471, the volume changing part 473, and the localization position changing part 475. The sound image localization process determining part 572 performs an operation similar to the sound image localization process determining part 472 of the second embodiment, and appropriately outputs at least one of "downward approach signal", "upward recede signal", "left approach signal", "right approach signal", "left recede signal", or "right recede signal" to the localization position changing part 475 according to the change in the attribute information from the attribute information acquiring part 571 and the selected information from the selected information acquiring part 470.

The downward approach signal is a signal for moving the localization position of the sound image from the front side on the bottom of the user towards the front side on the front to move the sound image so as to move closer to the user; and the upward recede signal is a signal for moving the localization position of the sound image from the front side on the front of the user towards the front side on the top to move the sound image so as to move away from the user.

More specifically, the sound image localization process determining part 572 operates similar to the second embodiment if the attribute information of the first music and the attribute information of the second music are the same when the selected information is changed. The sound image localization process determining part 572 operates as below when the attribute informations are different.

The sound image localization process determining part 572 first outputs the fade-out signal of the Ach of the first music to the volume changing part 473. The sound image localization process determining part 572 checks the music group of the second group indicated in the attribute information and determines whether or not the relevant music group is the same as the music group of the first music. The sound image localization process determining part 572 outputs the upward recede signal of the Ach and the downward approach signal of the Bch to the localization position changing part 475 when the music group of the second music and the music group of the first music are different. The sound image localization process determining part 572 outputs the fade-in signal of the Bch to the volume changing part 473.

(a. Other Configuration Example of Sound Image Localization Processing Unit 44)

The configuration of the music reproducing device 50 according to the present embodiment has been described above.

Similar to the sound image localization processing circuit 141 of the first embodiment, the sound image localization processing circuits 141A, 141B of the sound image localization processing unit 44 are configured by two sound image localization filters 141L, 141R, but the present invention is not limited to this example. That is, the sound image localization processing circuits 141A, 141B may be arbitrarily configured as long as it can move the localization position of the sound image not only in the left and right direction, but also in the up and down direction. The sound image localization processing circuit 541 or the other configuration example of the sound image localization processing circuits 141A, 141B will be described prior to describing the operation of the music reproducing device 50 according to the present embodiment. That is, the sound image localization processing unit 44 may be configured by replacing each of the two sound image localization processing circuits 141A, 141B with the sound image localization processing circuit 541 described below.

Figure 14:
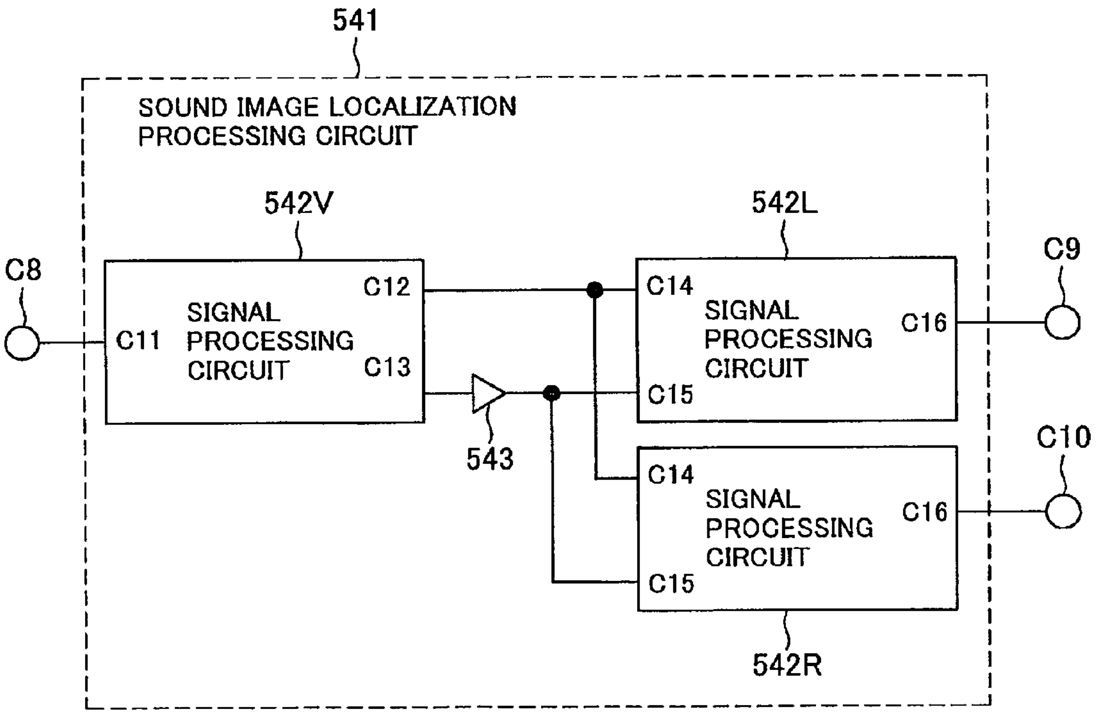
FIG. 14 is an explanatory view describing another example of a configuration of the sound image localization processing circuit.

The configuration of the sound image localization processing circuit 541 according to another configuration example is shown in FIG. 14.

The sound image localization processing circuit 541 shown in FIG. 14 includes signal processing circuits 542V, 542L, and 542R; and a level controller 543. A terminal C8 is connected to the Ach or the Bch of the volume varying unit 43, and terminals C9, C10 are connected to the D/A conversion circuits 151L, 151R of the D/A converter 15.

Figure 15:
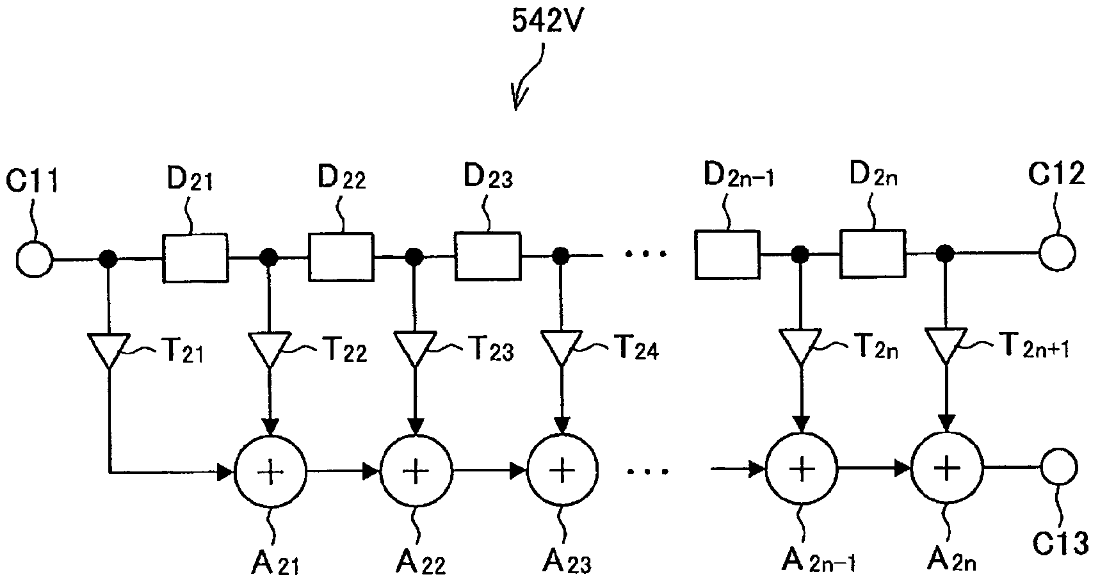
FIG. 15 is an explanatory view describing a configuration of a signal processing circuit.
Figure 16:
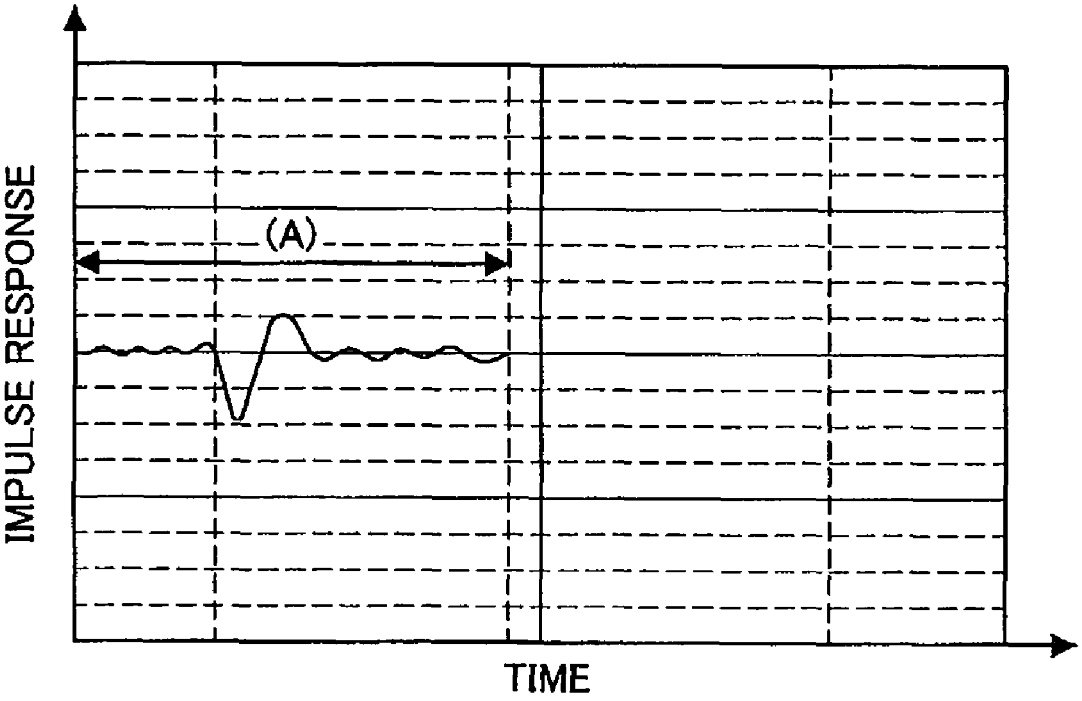
FIG. 16 is an explanatory view describing an impulse response by the signal processing circuit.

The signal processing circuit 542V is configured by an FIR filter as shown in FIG. 15, and includes delay units $D_{21}$~$D_{2n}$, coefficient multipliers $T_{21}$~$T_{2n+1}$, and adders $A_{21}$~$A_{2n}$. The signal processing circuit 542V performs a convolution operation process of an impulse response (A) for localizing the sound image on the upper side or the lower side of the listener, as shown in FIG. 16, on the audio signal from the terminal C11. The signal processing circuit 542V outputs the convolution operation processed audio signal from the terminal C13, and outputs the non-convolution operation processed audio signal from the terminal C12.

Figure 17:
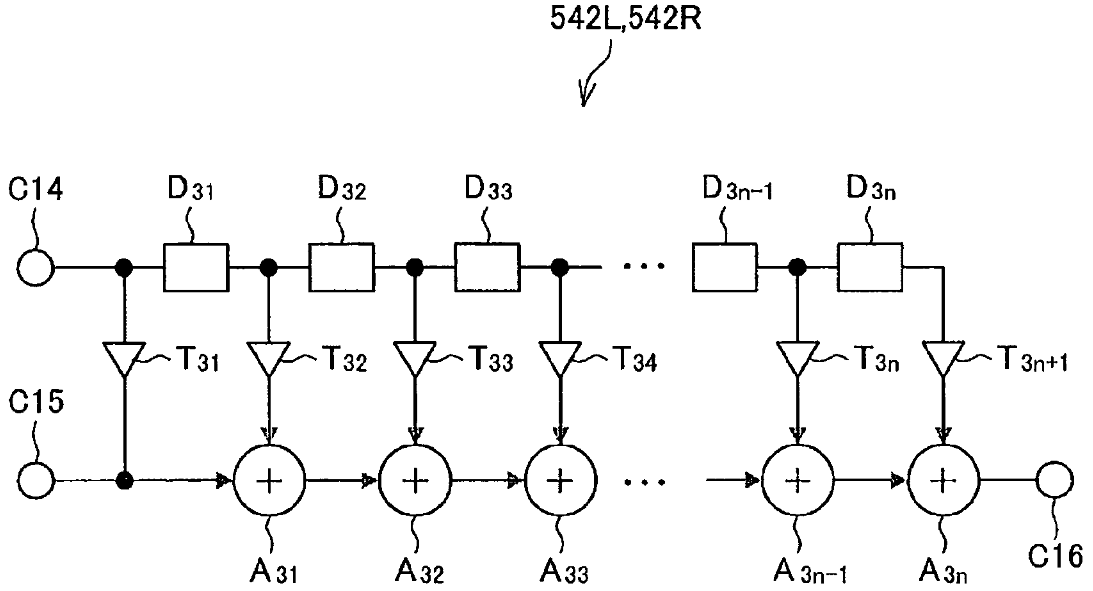
FIG. 17 is an explanatory view describing a configuration of the signal processing circuit.
Figure 18:
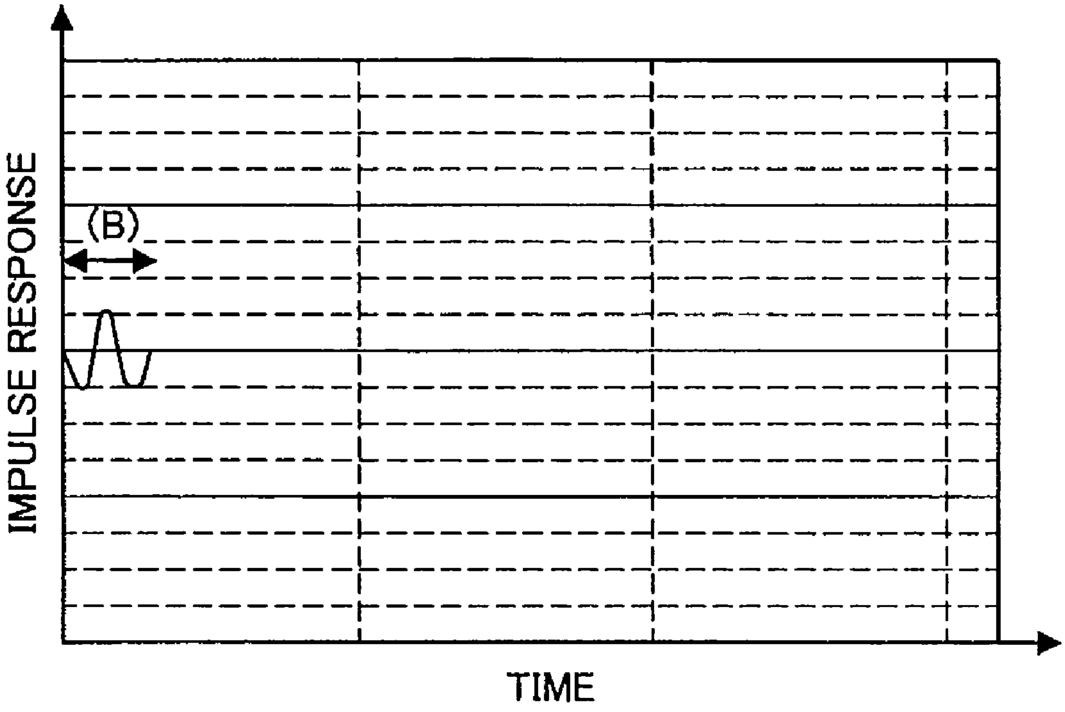
FIG. 18 is an explanatory view describing an impulse response by the signal processing circuit.

Each signal processing circuit 542L, 542R is configured by a digital filter as shown in FIG. 17, and includes delay units $D_{31}$~$D_{3n}$, coefficient multipliers $T_{31}$~$T_{3n+1}$, and adders $A_{31}$~$A_{3n}$. The signal processing circuit 542L, 542R performs a convolution operation process of an impulse response (B) for localizing the sound image at the front side on the front of the listener, as shown in FIG. 18, on the audio signal from the terminal C14. The signal processing circuit 542L has the coefficient of the coefficient multipliers $T_{31}$~$T_{3n+1}$ set to reproduce the head related transfer property to the left ear of the listener as impulse response, and the signal processing circuit 542R has the coefficient of the coefficient multipliers $T_{31}$~$T_{3n+1}$ set to reproduce the head related transfer property to the right ear of the listener as impulse response.

The signal processing circuit 542V, and the signal processing circuit 542L or the signal processing circuit 542R are connected as below. As shown in FIG. 14, the terminal C12 of the signal processing circuit 542V is directly connected to the terminal C14 of the signal processing circuit 542L and the signal processing circuit 542R. Thus, the signal not subjected to convolution process by the signal processing circuit 542V becomes the input of the delay unit of the signal processing circuit 542L and the signal processing circuit 542R, and the respective impulse response is convolution processed.

The terminal C13 of the signal processing circuit 542V is connected to the terminal C14 of the signal processing circuit 542L and the signal processing circuit 542R through the level controller 543. The signal convolution processed by the signal processing circuit 542V becomes the input of the adder of the signal processing circuit 542L and the signal processing circuit 542R.

Figure 19:
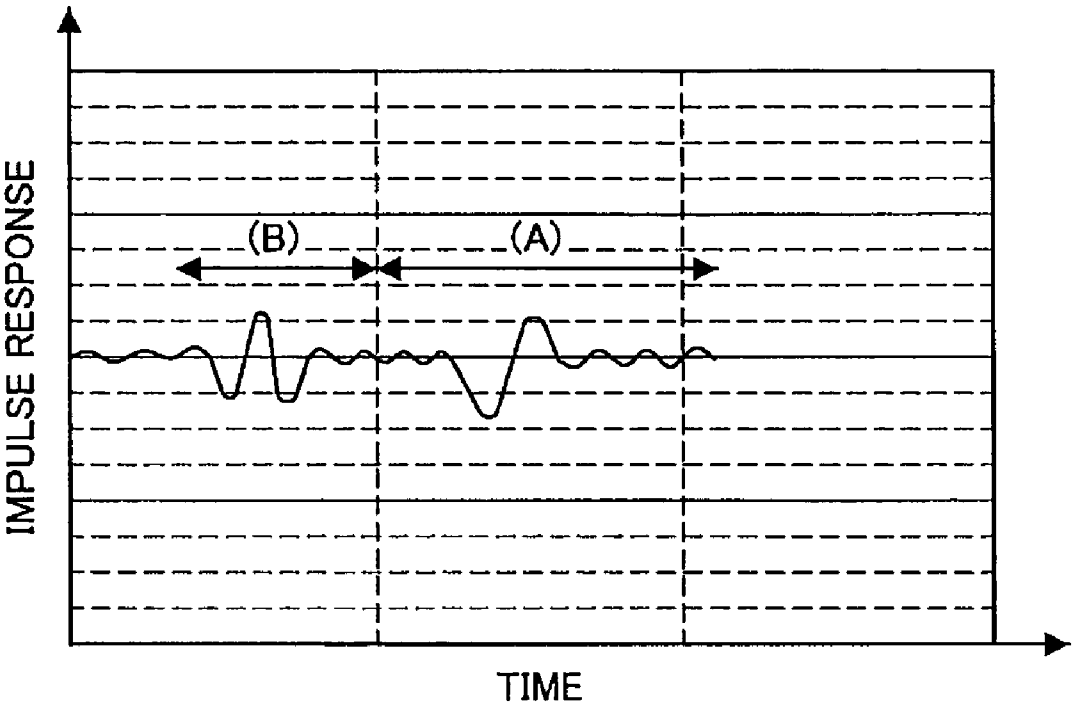
FIG. 19 is an explanatory view describing the impulse response by the sound image localization processing circuit.

Therefore, according to the sound image localization processing circuit 541, the convolution process combining the feature part (A) of the impulse response to the upper side or the lower side and the feature part (B) of the impulse response to the front side on the front can be performed from the terminals C9, C10, as shown in FIG. 19. Thus, the sound image can be localized on the front side on the top or the front side on the bottom. The level of the level controller 543 is reduced from this state, so that the component of the feature part (A) of the impulse response to the upper side or the lower side is reduced, and the sound image is moved to the front side on the front.

According to the sound image localization processing circuit 541 of such configuration, the localization position of the sound image can be moved by simply changing the level of the level controller 543 without changing all the coefficients of the coefficient multiplier $T_{31}$ to $T_{3n+1}$ corresponding to the impulse response. The sound image localization processing unit 44 of moving the sound image localization position with an extremely simple configuration is thereby realized.

(3-2. Operation of Music Reproducing Device 50)

The music reproducing device 50 according to the present embodiment including the other configuration example of the sound image localization processing unit 44 has been described above. The operation of the music reproducing device 50 according to the present embodiment having the above configuration will now be described with reference to FIGS. 20 and 21. The music reproducing device 50 may operate similar to the music reproducing device 40 according to the second embodiment. The operation different from the second embodiment will be centrally described below.

First, while the first music is being reproduced using the Ach, the music group selecting circuit 511 selects and acquires the audio signal of one or more music 1, 1 to 1, n contained in the music group 1 to which the second music to be newly reproduced belongs from the recording device 20, and records the same in the music recording circuit 512. Here, the attribute information output from the music group selecting circuit 511 to the control unit 57 is switched from the music group to which the first music belongs to the music group to which the second music belongs.

The selecting circuit 411 selects and acquires the audio signal of the second music to be newly reproduced from the music recording circuit 512, and outputs the audio signal to the reproducing unit 42. In this case, the selected information output from the selecting circuit 411 to the control unit 57 is switched from the information indicating the first music to the information indicating the second music.

Figure 20:
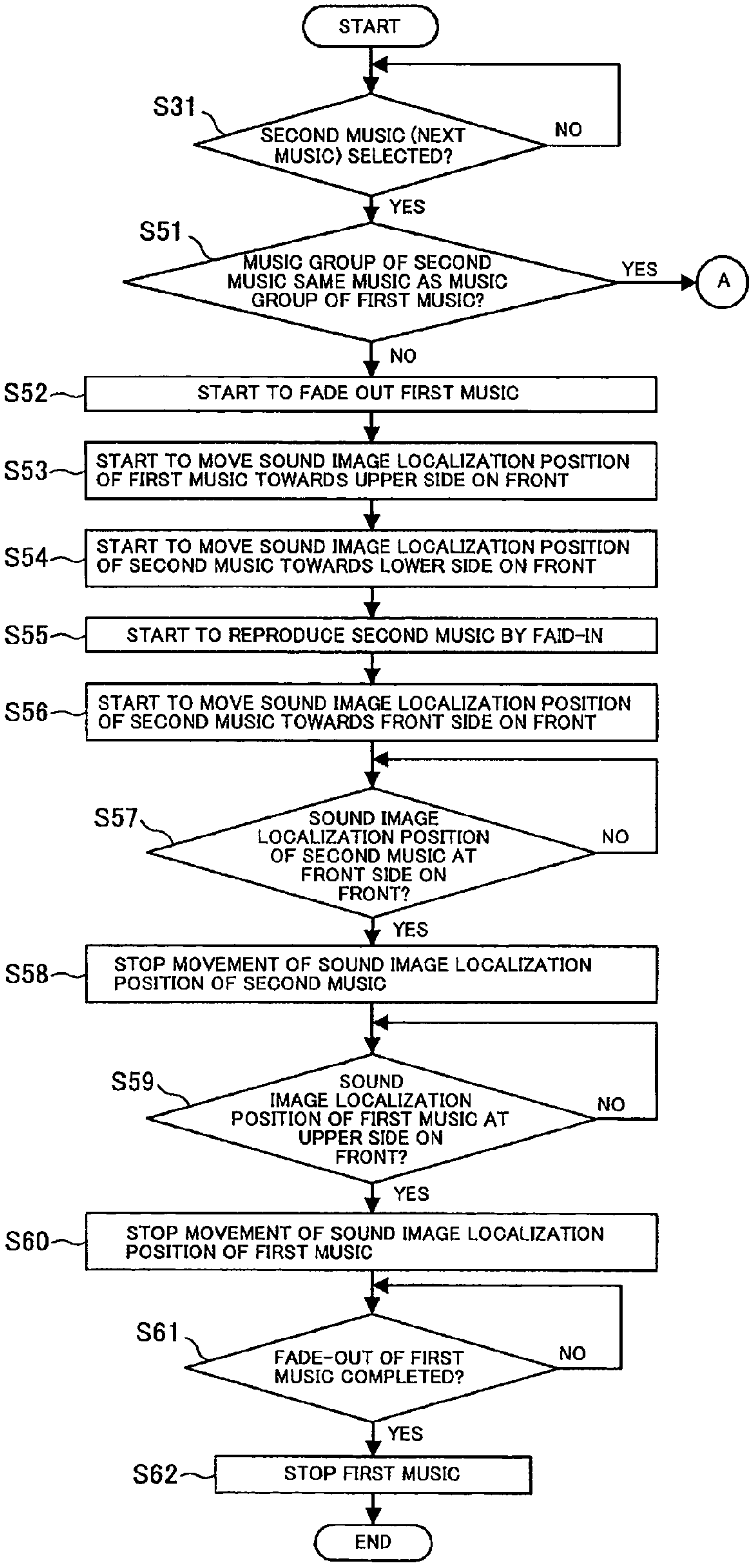
FIG. 20 is a flowchart describing the operation in switching music groups of the music reproducing device according to the embodiment.

In step S31, the sound image localization process determining part 572 acquiring the selected information through the selected information acquiring part 470 determines whether the reproduction state is changed. More specifically, as shown in FIG. 20, the sound image localization process determining part 572 determines whether or not the selected information is changed from the information indicating the first music to the information indicating the second music. The process proceeds to step S51 if the sound image localization process determining part 572 determines that the second music, that is, a new music is selected.

In step S51, the sound image localization process determining part 572 checks the attribute information acquired through the attribute information acquiring part 571. If the attribute information of the first music and the attribute information of the second music are the same, operations similar to the second embodiment are performed (proceed to step S32 of FIG. 11). If the attribute information are different, operations after step S52 are performed. More specifically, operations after step S52 are performed if the music group (hereinafter referred to as "second music group") to which the second music belongs and the music group (hereinafter referred to as "first music group") to which the first music belongs are different.

In step S52, the sound image localization process determining part 572 outputs the fade-out signal (fade-out signal of Ach) of the first music, that is, the currently reproducing music to the volume changing part 473. The volume changing part 473 gradually decreases the amplifying amount of the volume varying unit 43 (i.e., volume varying circuit 131A) of the Ach or the channel of the first music, and starts to fade out of the first music.

The process proceeds to step S53 after the process of step S52, and the localization position changing part 475 starts to move the localization position of the sound image of the first music from the front side on the front towards the front side on the top of the user. More specifically, the sound image localization process determining part 472 outputs the upward recede signal of the Ach to the localization position changing part 475. The localization position changing part 475 receiving the signal acquires from the coefficient recording part 176 the coefficient value etc. of the FIR filter corresponding to the head related transfer function of having the position shifted to the front side on the top from the current localization position as the localization position. The localization position changing part 475 outputs the coefficient value to the Ach of the sound image localization processing unit 44 and changes the coefficient value etc. of the FIR filter. The localization position changing part 475 moves the localization position of the Ach by repeating such operation.

The process proceeds to step S54 after the process of step S53, and the localization position changing part 475 sets the localization position of the sound image of the second music of the sound image localization processing unit 44 so as to be at the front side on the bottom of the listener. More specifically, the sound image localization process determining part 572 outputs the downward approach signal of the Bch to the localization position changing part 475. The localization position changing part 475 receiving the signal acquires from the coefficient recording part 176 the coefficient value etc. of the FIR filter corresponding to the head related transfer function of having the localization position of Bch at the front side on the bottom. The localization position changing part 475 outputs the coefficient value to the sound image localization processing unit 44 and changes the coefficient value etc. of the FIR filter.

The process proceeds to step S55 after the process of step S54, and the volume varying unit 43 adjusts the volume of the Bch for fade-in reproduction while the reproducing unit 42 is reproducing the digital data of the second music, so that the second music is reproduced by fade-in. More specifically, the sound image localization process determining part 572 outputs the fade-in signal of the Bch to the volume changing part 473. The volume changing part 473 receiving the signal gradually increases the amplifying amount (volume varying circuit 131B) of the Bch of the audio signal of the volume varying unit 43 to a predetermined value, and the volume varying unit 43 amplifies the audio signal of the Bch by such amplifying amount.

The process proceeds to step S56 after the process of step S55, and the localization position changing part 475 moves the localization position of the sound image of the second music towards the front side on the front of the user. More specifically, the localization position changing part 475 acquires from the coefficient recording part 176 the coefficient value etc. of the FIR filter corresponding to the head related transfer function of having the position shifted to the front side on the front from the current localization position as the localization position. The localization position changing part 475 outputs the coefficient value to the Bch of the sound image localization processing unit 44 and changes the coefficient value etc. of the FIR filter. The localization position changing part 475 moves the localization position of the Bch by repeating such operation.

The process proceeds to step S57 after the process of step S56, and determination is made on whether or not the localization position of the second music is now at the front side on the front of the user by the localization position acquiring part 474 and the localization position changing part 475. More specifically, the localization position acquiring part 474 acquires the localization position information indicating the current Bch localization position, and outputs the same to the localization position changing part 475. Furthermore, the localization position changing part 475 determines whether or not the current Bch localization position represented by the localization position information is at the front side on the front. The process proceeds to step S58 if the localization position changing part 475 determines that the localization position of the Bch is at the front side on the front.

In step S58, the localization position changing part 475 terminates the changing of the localization position of the second music. After the process of step S58, the reproduction of the second music is continued with the localization position of the Bch set at the front side on the front. The process then proceeds to step S59.

In step S59, determination is made on whether or not the localization position of the first music is now at the front side on the top of the user by the localization position acquiring part 474 and the localization position changing part 475. More specifically, the localization position acquiring part 474 acquires the localization position information indicating the current Ach localization position, and outputs the same to the localization position changing part 475. Furthermore, the localization position changing part 475 determines whether or not the current Ach localization position represented by the localization position information is at the front side on the right. The process proceeds to step S60 if the localization position changing part 475 determines that the localization position of the Ach is at the front side on the top.

In step S60, the localization position changing part 475 terminates the changing of the localization position of the first music.

The process proceeds to step S61 after the process of step S60, and the volume changing part 473 determines whether the fade-out of the first music, that is, Ach by the volume varying unit 43 is completed. The process proceeds to step S62 if determined that the volume changing part 473 has completed the fade-out of the first music.

In step S62, the volume changing part 473 outputs the end signal to the Ach of the reproducing unit 42 when completing the fade-out, and the reproducing unit 42 stops the reproduction of the digital data of the first music when receiving the end signal of the Ach.

It can be recognized that while steps S31 to S62 are being performed, the left channel signal and the right channel signal of the audio signals of the first music and the second music localization processed by the sound image localization processing unit 44 are provided from the head phone 30 to the listener through the D/A converter 15 and the amplifying unit 16 as sound.

Figure 21:
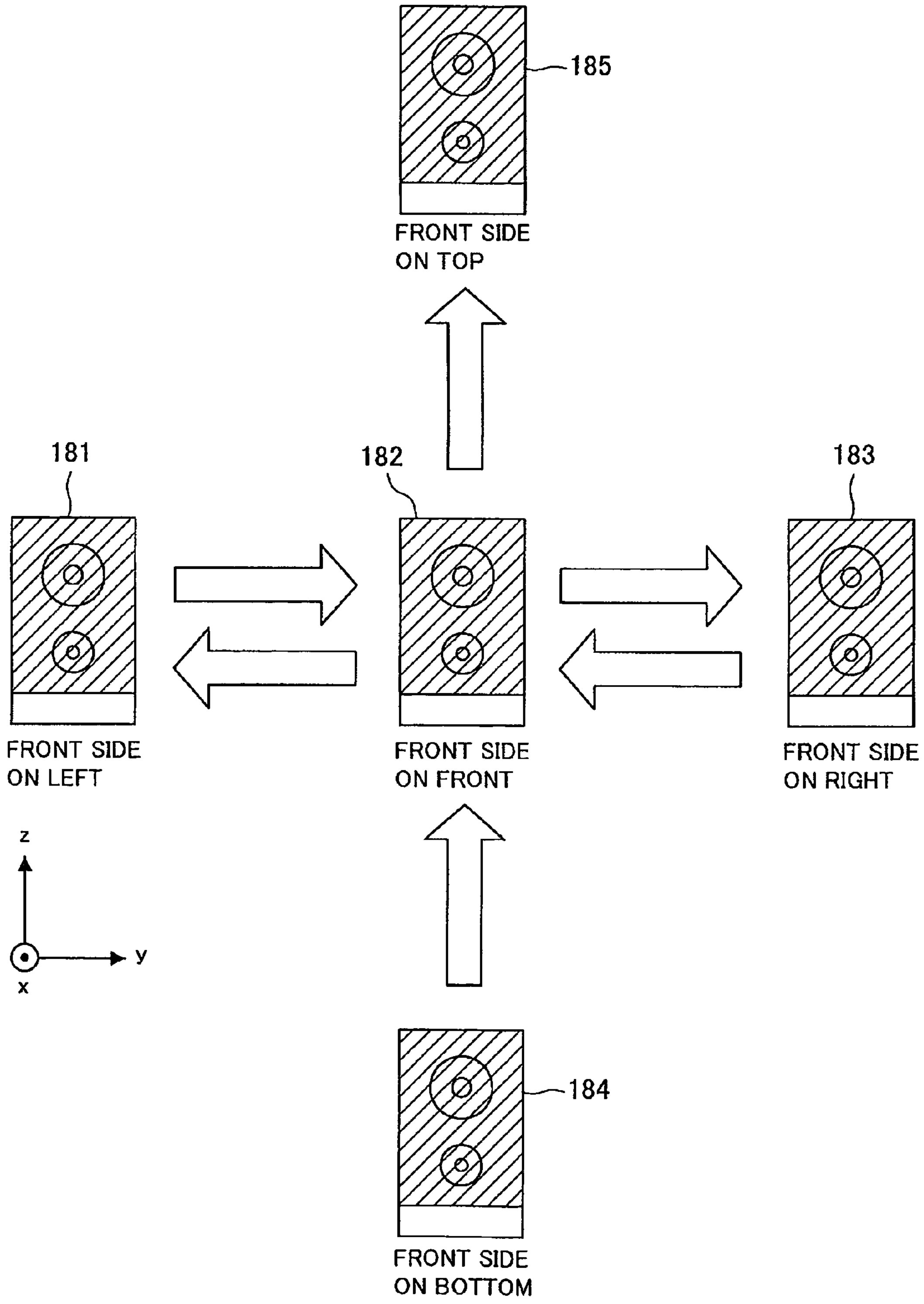
FIG. 21 is an explanatory view conceptually describing a manner in which the sound image localization position moves.

According to the above operation, the first music and the second music are so-called cross-faded, and switched while having the sound image moved. The sound images of both music are moved in the left and right direction if the first music and the second music are contained in the same music group. The sound images of both music are moved in the up and down direction if the first music and the second music are contained in different music groups. The manner in which the sound image moves is shown in frame format in FIG. 21. FIG. 21 is an explanatory view conceptually describing the manner in which the sound image localization position moves.

In FIG. 21, the localization positions 181 to 185 of the sound image are shown as speakers in frame format. Furthermore, in FIG. 21, the listener is assumed to be facing the negative direction of the x-axis at the positive position of the x-axis. The negative direction of the y-axis is the left direction for the listener, the positive direction of the y-axis is the right direction for the listener, the positive direction of the z-axis is the upward direction for the listener, and the negative direction of the z-axis is the downward direction for the listener.

When the reproducing music is switched from the first music to the second music, both music are cross faded. The localization positions of the sound images of both music are moved as shown in FIG. 21. If the first music and the second music are in the same music group (same attribute), the sound image of the first music is moved from the localization position 182 at the front side on the front towards the localization position 183 at the front side on the right or the localization position 181 at the front side on the left. At the same time, the localization position of the sound image of the second music is moved from the localization position 181 at the front side on the left or the localization position 183 at the front side on the right towards the localization position 182 at the front side on the front. That is, in this case, both music are switched while moving in the left and right direction.

If the first music and the second music are in different music groups (different attribute), the sound image of the first music is moved from the localization position 182 at the front side on the front towards the localization position 185 at the front side on the top. At the same time, the sound image of the second music is moved from the localization position 184 at the front side on the bottom towards the localization position 182 at the front side on the front. That is, in this case, both music are switched while moving in the up and down direction.

(3-3. Effect of Music Reproducing Device 50)

The configuration and the operation of the music reproducing device 50 according to the present embodiment have been described above.

According to the music reproducing device 50, the following effects are obtained in addition to the effects of the music reproducing device 40 according to the second embodiment.

Figure 22:
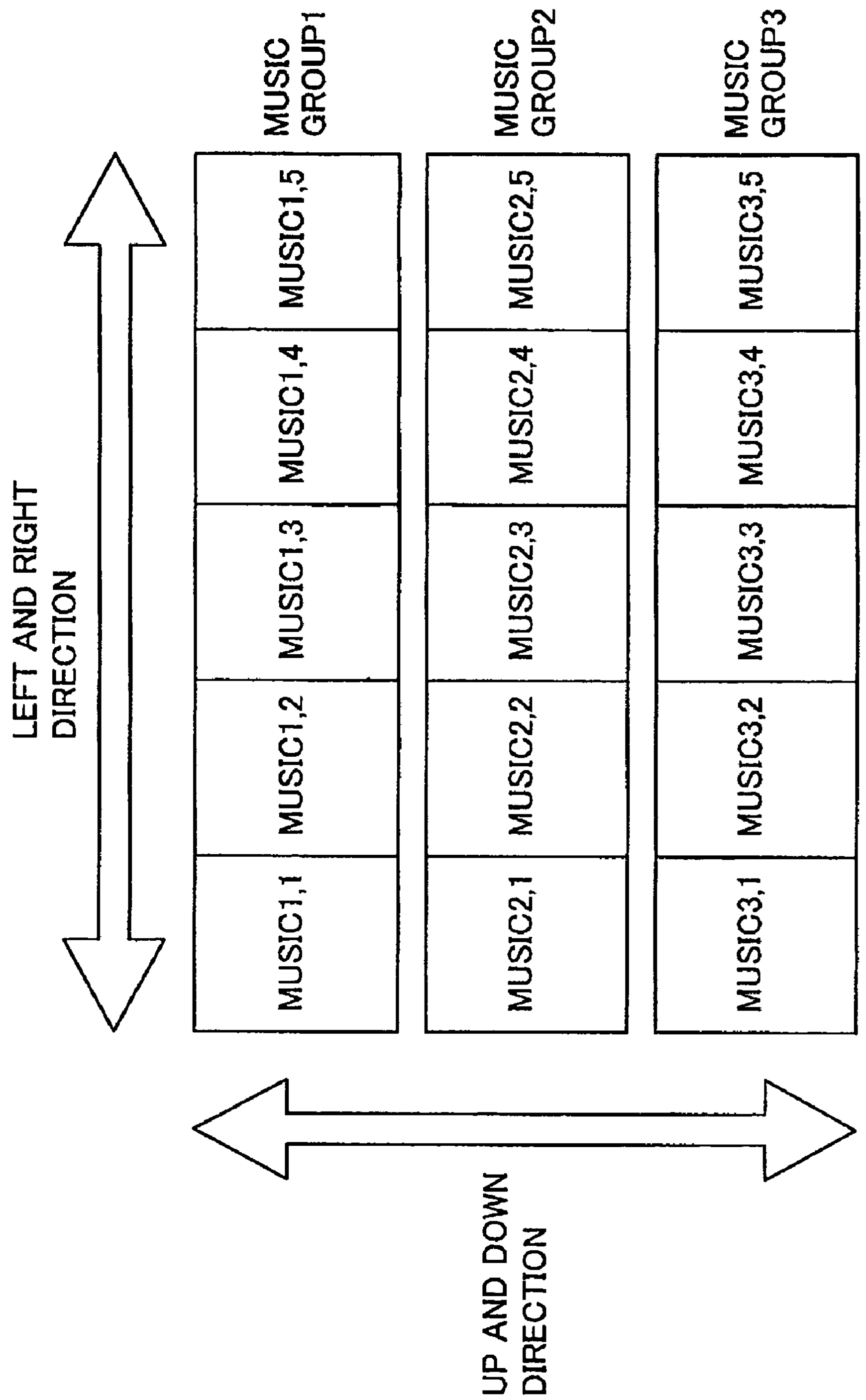
FIG. 22 is an explanatory view showing a relationship between a reproducing music and a moving direction of the sound image.

In other words, according to the music reproducing device 50, the relationship between the reproducing music and the moving direction of the sound image as shown in FIG. 22 can be recognized by the user by moving the sound image according to the attribute. FIG. 22 is an explanatory view showing the relationship between the reproducing music and the moving direction of the sound image.

More specifically, an interface of music selection such that the sound image moves in the left and right direction (e.g., from music 2, 3 to music 2, 1) when selecting the music contained in the same music group (e.g., music group 2), and the sound image moves in the up and down direction (e.g., from music 2, 3 to music 3, 3) when selecting the music contained in different music groups (e.g., music group 2 and music group 3) is provided. According to the music reproducing device 50, a so-called "Cross Media Bar (registered trademark)" in the content data selection of the music etc. can be realized with the sound image.

Such music reproducing device 50 is operated in conjunction with the selection of music by a visual Cross Media Bar (registered trademark), so that greater performance effects can be provided to the listener. That is, according to the music reproducing device of the related art, there is no correlation other than volume between the visual operation recognized in time of selecting music and the sound to be reproduced, where the sound to be reproduced is separate from the interface to be selected. However, according to the music reproducing device 50, if the listener selects the music with the visual Cross Media Bar (registered trademark), the sound image that moves in conjunction with the movement of the Cross Media Bar (registered trademark) can be provided to the listener. As a result, the sense of unity of the movement of the Cross Media Bar (registered trademark) and the music to be reproduced can be provided to the listener.

Therefore, according to the music reproducing device 50 of the present embodiment, various performance effects can be exhibited when reproducing the music and providing the same to the user. However, the performance effects described above are merely examples, and the music reproducing device 50 according to the present embodiment can exhibit various other performance effects.

It can be understood by those skilled in the art that various modifications, combinations, sub-combinations and alterations may occur depending on design requirements and other factors insofar as they are within the scope of the appended claims or the equivalents thereof.

In the embodiment described above, the music reproducing device 10 has been described as one example of information processing device assuming the content data of music 1 to n etc. is to be reproduced. However, this content data is not limited to music, and may be any content data as long as the output device outputs audio data in reproduction. The content data may be, in addition to music, voice, video image, TV image, movie image, flash, and the like. The information processing device of the present invention can be applied to devices etc. for reproducing such content data.

In the embodiment described above, the digital data of the music is recorded on the recording device 20, and such digital data is reproduced with the music reproducing device 10. However, the music may be recorded as analog data. In this case, the music reproducing device 10 may include the "A/D converter" between the recording device 20 and the sound image localization processing unit 14, so that the music of analog data is converted to digital data and sound image localization processed by the sound image localization processing unit 14.

In the embodiment described above, a case of using the headphone 30 has been described as one example of the output device for providing the sound reproducing the music to the user. However, the output device is not limited to the headphone 30, and may be other output devices capable of issuing sound such as speaker, speaker system, bone conduction speaker, and the like. In this case, the coefficient etc. determining the characteristic of the FIR filter of the sound image localization processing unit 14 may be changed and the head related transfer function suited for the output device may be changed to realize the information processing device of the present invention. When equipped with a plurality of speakers, the information processing device of the present invention can be realized by changing the number of FIR filters etc. of the sound image localization processing unit 14.

In the embodiment described above, the digital data of the music is audio data of monaural sound. However, the digital data of the music may be audio data of multi-channels of stereo sound etc. In this case, the information processing device of the present invention is realized by changing the number and the arrangement of each configuration so as to perform similar process for every corresponding channel.

The music reproducing device 10 etc. has been described as including the volume varying unit 13 in the embodiment described above, but the music reproducing device 10 etc. may not include the volume varying unit 13.

In the embodiment described above, a case where "change in reproduction state" is start of reproduction, end of reproduction, and switching of reproducing music has been described. However, change in reproduction state is not limited to such examples, and may be pause of reproduction of music, resume of reproduction, repeat setting, mixing, slow reproduction, double speed reproduction, and the like. Furthermore, change in reproduction state may be a state corresponding to switching etc. of image if the content data is reproduced with image etc., and may correspond to change etc. of operation by gate etc. corresponding to the operation of the user if the content data is game etc. If the change in reproduction state is pause, it can be realized with the operation similar to the operation performed at the end of reproduction in the first embodiment. If the change in reproduction state is resuming of reproduction, it can be realized with the operation similar to the operation performed at the start of reproduction in the first embodiment. Various other variations can be considered.

In the embodiment described above, a case where the moving direction of the localization position of the sound image is left and right direction, and up and down direction has been described. However, the moving direction of the localization position of the sound image can be set in various directions by changing the characteristics of the FIR filter etc. The sound image localization position may be moved so as to rotate on the circumference with the head of the listener as the center. Such movement of localization position provides a more stereoscopic sound image to the listener, and provides various information to the hearing of the listener. That is, the listener can sense as if the music sound is rotating about the listener himself/herself by listening to the sound image moving as if rotating on the circumference.

In the embodiment described above, a case where the sound image localization processing unit 14M2, 44M includes the fixed sound image localization processing circuit 145L for fixing the sound image at the front side on the left and the fixed sound image localization processing circuit 145R for fixing the sound image at the front side on the right has been described. However, the number of fixed sound image localization processing circuit is not limited to such example. Three or more fixed sound image localization processing circuits may be used such as for front side on the left, front side on the front, front side on the right, back side on the left, back side on the right, and the like which are speaker arrangements used on a standard scale with DVD etc. In this case, the localization position of the sound image can be controlled by allocating the audio signal to each fixed sound image localization processing circuit by level distribution.

In the embodiment described above, the operation of when the selecting unit 41 switches the first music being reproduced on the Ach and the second music to be newly reproduced on the Bch has been described, but the present invention is not limited to such example. For instance, when the selecting unit 41 selects the first music and the second music, the music reproducing device 40 may remix the music and reproduce the same.

That is, the music reproducing device 40 may start to reproduce the first music on the Ach, and move the sound image localization position of the first music from the front side on the left towards the front side on the front. Furthermore, the music reproducing device 40 may start to reproduce the second music on the Bch, and move the sound image localization position of the second music from the front side on the right towards the front side on the front. As a result, the sound images of both music are localized at the front side on the front. Therefore, the music reproducing device 40 may remix both music at the front side on the front of the listener and reproduce the same.

In this case, the number of music is not limited to two music of first music and second music, and three or more music can be remixed. When reproducing and remixing the plurality of music, the music reproducing device 40 is configured to further include a plurality of channels other than Ach and Bch, where each channel may be configured similar to the above. The sound image localization position by the sound image localization processing unit 44 may be set in plurals as the initial position at where the music of each channel starts to be reproduced. That is, each channel may set the sound image localization position serving as the initial position so as to be substantially even in the up and down or left and right angle directions with the front side on the front or the position of the listener as the center so that the plurality of music starts to be reproduced at different localization positions. The sound image localization position of the music reproduced in each channel is respectively moved towards the front side on the front. As a result, the sound image of the plurality of music localize at the front side on the front. Therefore, the music reproducing device 40 can remix the plurality of music at the front side on the front of the listener, and reproduce the same.

A series of processes described in each embodiment may be executed by a dedicated hardware or may be executed by software. When executing the series of processes with software, the series of processes can be realized by executing the program with a general purpose or a dedicated computer shown in FIG. 23.

Figure 23:
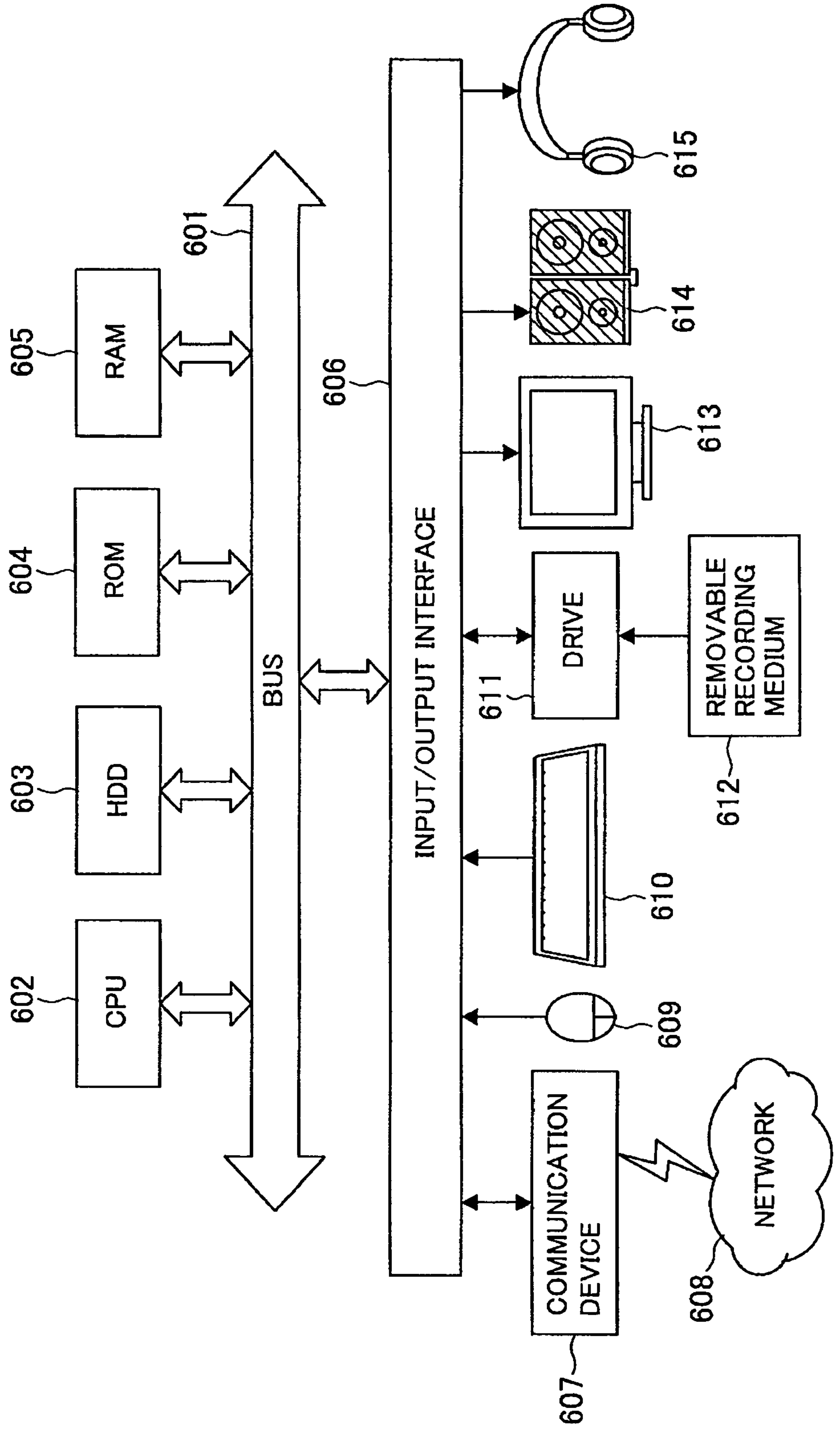
FIG. 23 is an explanatory view describing a configuration of a computer for realizing a series of processes by executing a program.

FIG. 23 is an explanatory view describing a configuration example of a computer realizing the series of processes by executing the program. The execution of the program for performing the series of processes by the computer is described below.

As shown in FIG. 23, the computer includes a bus 601, a CPU (Central Processing Unit) 602, a recording device, an input/output interface 606, a communication device 607, an input device, a drive 611, an output device, and the like. Each configuration is connected so as to transmit information to each other by way of the bus 601 and the input/output interface 606.

The program is recorded in HDD (Hard Disc Drive) 603, ROM (Read Only Memory) 604, RAM (Random Access Memory) 605, and the like, which are examples of the recording device.

The program may be temporarily or permanently recorded on a removable recording medium 612 such as flexible disc, optical disc, magnetic disc, semiconductor memory, and the like including various CD (Compact Disc), MO (Magnetic Optical) disc, and DVD (Digital Versatile Disc). The removable recording medium 612 is provided as so-called package software. In this case, the program recorded on the removable recording medium 612 is read out by the drive 611, and recorded in the recording device via the input/output interface 606, the bus 601, and the like.

The program may be recorded on a download site, other computers, other recording devices and the like (not shown). In this case, the program is transferred via the network 608 such as LAN (Local Area Network), Internet, and the like, and the communication device 607 receives the program. The program received by the communication device 607 may be recorded on the recording device via the input/output interface 606, the bus 601, and the like.

The CPU 602 executes various processes according to the program recorded on the recording device to realize the series of processes. In this case, the CPU 602 may directly readout the program directly from the recording device, and execute the same after once loading the same in the RAM 605. Furthermore, when receiving the program through the communication device 607 or the drive 611, the CPU 602 may directly execute the received program without recording the same on the recording device.

The CPU 602 may carry out various processes based on the signal and the information input from the input device such as mouse 609, keyboard 610, microphone (not shown), and the like as necessary.

The CPU 602 outputs the result of executing the series of processes from the output device such as the speaker 614 or the headphone 615. Furthermore, the CPU 602 may output the processing result to other output devices such as the monitor 613 as necessary, may transmit the same from the communication device 607, or may record the same in the recording device or the removable recording medium 612.

In the present specification, the steps described in the flowchart include not only the processes performed in time-series in the described order, but also processes executed in parallel or individually even if not processed in time-series. It is to be noted that the order may be appropriately changed as necessary even in the steps processed in time-series.

What is claimed is:

1. An information processing device comprising:

a reproducing unit for reproducing content data;

a processing unit for processing the content data to be reproduced by the reproducing unit so that a sound image by the content data localizes at an arbitrary position; and a control unit for moving the position at which the sound image localizes in response to change in reproduction state of the content data by the reproducing unit;

wherein the control unit moves the position at which the sound image localizes when the reproducing unit pauses or resumes the reproduction of the content data.

2. The information processing device according to claim 1, wherein the control unit moves the position at which the sound image localizes when the reproducing unit starts or ends the reproduction of the content data.

3. The information processing device according to claim 2, further comprising a volume varying unit for fading in the content data when the reproducing unit starts the reproduction of the content data, and fading out the content data when the reproducing unit ends the reproduction of the content data.

4. The information processing device according to claim 1, wherein the control unit moves the position at which the sound image localizes so as to move closer to an audience when the reproducing unit starts the reproduction of the content data, and moves the position at which the sound image localizes so as to move away from the audience when the reproducing unit ends the reproduction of the content data.

5. The information processing device according to claim 1, further comprising a selecting unit for selecting content data to be reproduced by the reproducing unit from a plurality of content data; wherein when the selecting unit selects second content data while the reproducing unit is reproducing first content data, the control unit moves the positions at which the sound images by the first content data and the second data localize, and causes the reproducing unit to end the reproduction of the first content data and start reproduction of the second content data.

6. The information processing device according to claim 5, wherein the control unit moves the position at which the sound image by the first content data localizes so as to move away from an audience, and moves the position at which the sound image by the second content data localizes so as to move closer to the audience.

7. The information processing device according to claim 5, wherein a reproducing order of the plurality of content data is determined; and the control unit reverses moving directions of the positions at which the sound image by the first content data and the second content data localize between when the reproducing order of the second content data is before and after the reproducing order of the first content data.

8. The information processing device according to claim 5, wherein the selecting unit has two or more methods of selecting the content data to be reproduced by the reproducing unit from the plurality of content data; and the control unit moves the positions at which the sound images by the first content data and the second content data localize in different directions for every method by which the second content data is selected.

9. The information processing device according to claim 8, wherein the directions of moving the positions at which the sound images by the first content data and the second content data localize include at least a left and right direction and an up and down direction with respect to the audience.

10. The information processing device according to claim 8, wherein the plurality of content data is respectively corresponded with attribute information; and the selecting unit includes, a first method of selecting the second content data from at least one content data corresponded with the attribute information same as the first content data, and a second method of selecting the second content data from at least one content data corresponded with the attribute information different from the first content data.

11. The information processing device according to claim 5, further comprising a volume varying unit of cross fading the first content data and the second content data by increasing a reproduction volume of the second content data while decreasing a reproduction volume of the first content data.

12. The information processing device according to claim 1, wherein the processing unit includes a plurality of filters in which the position at which the sound image localizes differs; and the control unit moves the position at which the sound image localizes by allocating and inputting an audio signal obtained by reproducing the content data in the reproducing unit to the plurality of filters.

13. The information processing device according to claim 1, wherein the processing unit includes a filter in which the position at which the sound image localizes is changeable; and the control unit moves the position at which the sound image localizes by changing a coefficient of the filter for determining the position at which the sound image localizes.

* * * * *